(12) United States Patent
Nakamura et al.

(10) Patent No.: US 7,847,499 B2
(45) Date of Patent: Dec. 7, 2010

(54) ELECTRIC LOAD APPARATUS, ELECTRIC LOAD CONTROLLING METHOD AND COMPUTER READABLE RECORDING MEDIUM RECORDING PROGRAM FOR CAUSING COMPUTER TO EXECUTE CONTROL OF ELECTRIC LOAD

(75) Inventors: Makoto Nakamura, Anjo (JP); Sumikazu Shamoto, Nagoya (JP); Eiji Sato, Toyota (JP); Ryoji Oki, Toyota (JP); Masayuki Komatsu, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1809 days.

(21) Appl. No.: 10/480,083

(22) PCT Filed: Oct. 3, 2002

(86) PCT No.: PCT/JP02/10341
§ 371 (c)(1),
(2), (4) Date: Dec. 8, 2003

(87) PCT Pub. No.: WO03/056694
PCT Pub. Date: Jul. 10, 2003

(65) Prior Publication Data
US 2004/0145338 A1    Jul. 29, 2004

(30) Foreign Application Priority Data
Dec. 26, 2001   (JP) .............................. 2001-393494

(51) Int. Cl.
*H02P 6/14* (2006.01)
(52) U.S. Cl. ............................ 318/400.27; 318/400.28; 318/400.3; 318/801

(58) Field of Classification Search ................. 318/801, 318/400.27, 400.28, 400.3; 322/40, 222; 363/80
See application file for complete search history.

(56) References Cited

U.S. PATENT DOCUMENTS 1,521,856 A    1/1925   Bivens (Continued)

FOREIGN PATENT DOCUMENTS

DE            40 13 506 A1   10/1991

(Continued)

OTHER PUBLICATIONS

U.S. Appl. No. 10/318,226, filed Dec. 13, 2002, Sato.

(Continued)

*Primary Examiner*—Paul Ip
(74) *Attorney, Agent, or Firm*—Oliff & Berridge, PLC

(57) ABSTRACT

An electric load apparatus (100) includes a DC power source (B), a voltage sensor (10, 20), system relays (SR1, SR2), a capacitor (11, 13), a DC/DC converter (12), an inverter (14), a current sensor (24), a rotation sensor (25), a control apparatus (30), and an AC motor (M1). The control apparatus (30) restricts an increase amount of consumed power in the AC motor (M1) in a range in which the driving operation of the electric load apparatus (100) can be maintained, when the increase amount of the consumed power in the AC motor (M1) exceeds an allowable power that can be supplied from the capacitor (13) to the inverter (14).

35 Claims, 21 Drawing Sheets

U.S. PATENT DOCUMENTS

| | | | |
|---|---|---|---|
| 3,659,263 A | | 4/1972 | Gunsser et al. |
| 4,875,539 A | * | 10/1989 | Abukawa et al. ............ 180/446 |
| 5,159,990 A | | 11/1992 | Abe et al. |
| 5,213,177 A | | 5/1993 | May |
| 5,289,361 A | * | 2/1994 | Vinciarelli .................... 363/80 |
| 5,406,192 A | * | 4/1995 | Vinciarelli .................. 323/222 |
| 5,737,714 A | | 4/1998 | Matsuno et al. |
| 5,751,150 A | * | 5/1998 | Rippel et al. ................ 324/537 |
| 5,847,534 A | * | 12/1998 | Tanamachi et al. .......... 318/801 |
| RE36,037 E | * | 1/1999 | Rimmer ...................... 307/9.1 |
| 6,002,221 A | * | 12/1999 | Ochiai et al. ................ 318/139 |
| 6,023,137 A | * | 2/2000 | Kumar et al. .......... 318/400.27 |
| 6,028,406 A | * | 2/2000 | Birk .......................... 318/254 |
| 6,060,859 A | | 5/2000 | Jonokuchi ................... 318/801 |
| 6,075,328 A | * | 6/2000 | Notohara et al. ............ 318/254 |
| 6,091,615 A | * | 7/2000 | Inoshita et al. ................ 363/98 |
| 6,205,097 B1 | | 3/2001 | Dark et al. |
| 6,450,281 B1 | | 9/2002 | Kohler et al. |
| 6,590,360 B2 | * | 7/2003 | Hirata et al. ................ 318/727 |
| 6,608,396 B2 | * | 8/2003 | Downer et al. ........... 290/40 C |
| 6,626,002 B1 | * | 9/2003 | Notohara et al. ........... 62/228.4 |
| 6,642,679 B2 | * | 11/2003 | Nagatake et al. ............ 318/139 |
| 6,690,593 B2 | * | 2/2004 | Kimura et al. ................ 363/98 |
| 6,987,371 B2 | * | 1/2006 | Kifuku ....................... 318/432 |
| 7,451,847 B2 | | 11/2008 | Hommi |
| 2001/0032046 A1 | | 10/2001 | Nada |
| 2001/0054520 A1 | | 12/2001 | Hosomi et al. |
| 2002/0084127 A1 | | 7/2002 | Kohler et al. |
| 2003/0067278 A1 | | 4/2003 | Nakamura et al. |
| 2003/0081440 A1 | | 5/2003 | Komatsu et al. |
| 2003/0107352 A1 | * | 6/2003 | Downer et al. ................ 322/40 |
| 2003/0117823 A1 | | 6/2003 | Sato |

FOREIGN PATENT DOCUMENTS

| | | |
|---|---|---|
| EP | 0 825 059 | 2/1998 |
| EP | 1 000 796 | 5/2000 |
| JP | A-62-114493 | 5/1987 |
| JP | A 8-33394 | 2/1996 |
| JP | A 8-107683 | 4/1996 |
| JP | A 8-214592 | 8/1996 |
| JP | A-09-032564 | 2/1997 |
| JP | A-9-191506 | 7/1997 |
| JP | A-10-66267 | 3/1998 |
| JP | A 10-66385 | 3/1998 |
| JP | A 10-136570 | 5/1998 |
| JP | A 10-332012 | 12/1998 |
| JP | 11-029290 | 2/1999 |
| JP | A-11-89270 | 3/1999 |
| JP | A 11-89284 | 3/1999 |
| JP | A-11-252991 | 9/1999 |
| JP | A-2000-236679 | 8/2000 |
| JP | A 2000-350487 | 12/2000 |

OTHER PUBLICATIONS

U.S. Appl. No. 10/272,988, filed Oct. 18, 2002, Komatsu.

U.S. Appl. No. 10/251,827, filed Sep. 23, 2002, Nakamura et al.

* cited by examiner

ELECTRIC LOAD APPARATUS, ELECTRIC LOAD CONTROLLING METHOD AND COMPUTER READABLE RECORDING MEDIUM RECORDING PROGRAM FOR CAUSING COMPUTER TO EXECUTE CONTROL OF ELECTRIC LOAD

TECHNICAL FIELD

The present invention relates to an electric load apparatus that do not fail energetically, an electric load controlling method that do not fail energetically, and a computer readable recording medium recording a program for causing a computer to execute control of an electric load that do not fail energetically.

BACKGROUND ART

Recently, a hybrid vehicle and an electric vehicle are widely attracting attention as environment-friendly vehicles. The hybrid vehicle has partly been brought into practical use.

The hybrid vehicle is a vehicle powered by a DC (Direct Current) power source, an inverter, and a motor driven by the inverter, in addition to a conventional engine. Specifically, while it is powered by driving the engine, it is also powered by converting DC voltage from the DC power source by the inverter to AC (Alternating Current) voltage and rotating the motor by thus converted AC voltage. Additionally, the electric vehicle is a vehicle powered by a DC power source, an inverter and a motor driven by the inverter.

In such a hybrid vehicle or an electric vehicle, it has also been contemplated to increase DC voltage from a DC power source by a DC/DC converter and to supply the increased DC voltage to an inverter driving a motor (see Japanese Patent Laying-Open No. 8-214592).

Specifically, the hybrid vehicle or the electric vehicle is equipped with a motor driving apparatus shown in FIG. 19. Referring to FIG. 19, a motor driving apparatus 300 includes a DC power source B, system relays SR1 and SR2, capacitors 308 and 322, a bidirectional converter 310, a voltage sensor 320, and an inverter 330.

DC power source B outputs DC voltage. System relays SR1 and SR2, when being turned on by a control apparatus (not shown), supply the DC voltage from DC power source B to capacitor 308. Capacitor 308 smoothes the DC voltage supplied from DC power source B via system relays SR1 and SR2, and supplies the smoothed DC voltage to bidirectional converter 310.

Bidirectional converter 310 includes a reactor 311, NPN transistors 312 and 313, and diodes 314 and 315. Reactor 311 has its one end connected to a power supply line of DC power source B, and has its other end connected to an intermediate point between NPN transistor 312 and NPN transistor 313, i.e., between an emitter of NPN transistor 312 and a collector of NPN transistor 313. NPN transistors 312 and 313 are serially connected between the power supply line and an earth line. NPN transistor 312 has its collector connected to the power supply line, while NPN transistor 313 has its emitter connected to the earth line. Between the collectors and the emitters of NPN transistors 312, 313, diodes 314, 315 for passing current from the emitter side to the collector side are connected, respectively.

Bidirectional converter 310 has its NPN transistors 312 and 313 turned on/off by the control apparatus (not shown), and increases the DC voltage supplied from capacitor 308 to supply the output voltage to capacitor 322. Further, at a regenerative braking of the hybrid vehicle or the electric vehicle equipped with motor driving apparatus 300, the bidirectional converter 310 reduces the DC voltage generated by AC motor M1 and converted by inverter 330 and supplies it to capacitor 308.

Capacitor 322 smoothes the DC voltage supplied from bidirectional converter 310 and supplies the smoothed DC voltage to inverter 330. Voltage sensor 320 detects output voltage Vm of capacitor 322.

When supplied with the DC voltage from capacitor 332, inverter 330 converts the DC voltage to AC voltage based on the control from control apparatus (not shown) to drive AC motor M1. Thus, AC motor M1 is driven to produce the torque specified by a torque instruction value. Further, inverter 330 converts the AC voltage generated by AC motor M1 based on the control from the control apparatus to DC voltage, and supplies thus converted DC voltage to bidirectional converter 310 via capacitor 322.

Further, the hybrid vehicle is equipped with a motor driving apparatus 400 shown in FIG. 20. Referring to FIG. 20, motor driving apparatus 400 includes an inverter 340 in addition to the configuration of motor driving apparatus 300. The rest of the configuration is identical to that of motor driving apparatus 300.

Inverter 340 converts the DC voltage from capacitor 322 to the AC voltage based on the control from a control apparatus (not shown) to drive an AC motor M2 by thus converted AC voltage. Thus, AC motor M2 is driven to produce the torque specified by a torque instruction value. Further, inverter 340 converts the AC voltage generated by AC motor M2 to DC voltage based on the control from the control apparatus, and supplies thus converted DC voltage to bidirectional converter 310 via capacitor 322.

However, if power P transferred to AC motor M1 abruptly increases at time point t0 in motor driving apparatuses 300 and 400 as shown in FIGS. 21A and 21B, a storage voltage Vm of capacitor 322 decreases accordingly.

When a response time constant of DC/DC converter 310 at this time is tf, Vm<Vb (battery voltage) is invited if power P is abruptly transferred during tf. As a result, a problem may arise that current flows from DC power source B side to the output side of DC/DC converter 310 via diode 314 of DC/DC converter 310 without limitation, and DC/DC converter 310 can not increase the DC voltage from DC power source B with any selection of duty ratio.

Specifically, DC/DC converter 310 can not address the transfer of energy from capacitor 322 when the power from AC motor M1 abruptly changes due to the effect of reactor 311 accommodated in DC/DC converter 310, and therefore output voltage Vm of capacitor 322 decreases. Thus, an overcurrent occurs from DC power source B for recovering the dropped output voltage Vm of capacitor 322. The element of a chopper may be damaged if such a situation is continued.

Further, a rush current increases due to the drop of the output voltage of capacitor 322. Therefore, the damage of DC power source B worsens by the large current being transferred from DC power source B.

Still further, motor driving apparatus 400 has been involved with the following problem: When AC motor M1 is consuming the electricity stored in capacitor 322 and AC motor M2 is generating electricity, if AC motor M1 stops to consume the electricity stored in capacitor 322, then the DC power returned from inverter 340 to capacitor 322 abruptly increases, and the voltage being applied to bidirectional converter 310 abruptly increases. Then, bidirectional converter 310 will not be capable of following the abrupt increase of the voltage and therefore an overvoltage is applied thereto. As a result, there has been a problem that motor driving apparatus 400 may not operate normally.

DISCLOSURE OF THE INVENTION

Accordingly, one object of the present invention is to provide an electric load apparatus that do not fail energetically even when power in an electric load changes.

Another object of the present invention is to provide an electric load controlling method that do not fail energetically even when power in an electric load changes.

Still another object of the present invention is to provide a computer readable recording medium recording a program for causing a computer to execute control of an electric load that do not fail energetically even when power in an electric load changes.

According to the present invention, an electric apparatus includes a voltage converter, an electric load and a control circuit. The voltage converter performs voltage conversion between a first DC voltage being output from a DC power source and a second DC voltage having a different voltage level from a voltage level of the first DC voltage. The electric load is driven based on the second DC voltage output from the voltage converter. The control circuit controls a change amount of power in the electric load to be set in a range in which a driving operation of the electric load can be maintained when the change amount of the power exceeds a limit value. The limit value is a maximum value of the change amount of the power with which the driving operation of the electric load can be maintained.

Preferably, the power in the electric load is consumed power in the electric load, and the control circuit controls an increase amount of the consumed power to be at most as large as an allowable power that can be supplied to the electric load, when the increase amount of the consumed power exceeds the allowable power.

Preferably, the control circuit limits the consumed power.

Preferably, the control circuit decreases a voltage instruction value of the second DC voltage to control the voltage converter.

Preferably, the voltage converter includes first and second switching elements for an upper arm and a lower arm, and first and second flywheel diodes respectively connected to the first and second switching elements.

Preferably, the control circuit increases the allowable power to control the consumed power to be at most as large as the allowable power.

Preferably, the control circuit increases a voltage instruction value of the second DC voltage to control the voltage converter.

Preferably, the electric load includes a motor producing torque for driving a driving wheel of a vehicle, and an inverter converting the second DC voltage to AC voltage to drive the motor in accordance with control from the control circuit.

Preferably, the electric load apparatus further includes a capacitor element arranged between the voltage converter and the electric load and storing DC power. The electric load includes a first motor producing torque for driving a driving wheel of a vehicle, a first inverter converting the second DC voltage supplied from the capacitor element to AC voltage to drive the first motor in accordance with control from the control circuit, a second motor generating electricity by power from an engine of the vehicle, and a second inverter connected in parallel with the first inverter, converting AC power generated by the second motor to DC power and supplying said DC power to the capacitor element in accordance with control from the control circuit.

Preferably, the electric load apparatus further includes a generator connected in parallel with the electric load. The control circuit controls the generator such that the generated electricity increases.

Preferably, the electric load includes a motor producing torque for driving a driving wheel of a vehicle, and an inverter converting the second DC voltage to AC voltage to drive the motor in accordance with control from the control circuit. The generator generates electricity by power from an engine of the vehicle.

Preferably, the power in the electric load is generated electricity power in the electric load, and the control circuit controls an increase amount of the generated electricity power to be supplied from the electric load to the voltage to be at most as large as an response maximum value of the voltage converter, when the increase amount of the generated electricity power exceeds the response maximum value.

Preferably, the control circuit controls the voltage converter such that the voltage level of the second DC voltage decreases.

Preferably, the voltage converter includes first and second switching elements for an upper arm and a lower arm, and the control circuit increases time in which the first switching element is turned on to drive the voltage converter.

Preferably, the power in the electric load is one of consumed power and generated electricity power in the electric load. The control circuit controls an increase amount of the consumed power to be at most as large as an allowable power that can be supplied to the electric load, when the increase amount of the consumed power exceeds the allowable power. Additionally, the control circuit controls an increase amount of the generated electricity power supplied from the electric load to the voltage converter to be at most as large as a response maximum value of the voltage converter, when the increase amount of the generated electricity power exceeds the response maximum value.

Additionally, according to the present invention, an electric load controlling method includes a first step of detecting a change amount of power in an electric load, a second step of determining if the detected change amount of power exceeds a limit value, and a third step of controlling the change amount of power to be set in a range in which a driving operation of the electric load can be maintained, when the change amount of power exceeds the limit value. The limit value is a maximum value of the change amount of power with which the driving operation of the electric load can be maintained.

Further, according to the present invention, a computer readable recording medium recording a program for causing a computer to execute a first step of detecting a change amount of power in an electric load, and a second step of determining whether the detected change amount of power exceeds a limit value, and a third step of controlling the change amount of power to be set in a range in which a driving operation of the electric load can be maintained, when the change amount of power exceeds the limit value. The limit value is a maximum value of the change amount of power with which the driving operation of the electric load can be maintained.

Preferably, the first step detects an increase amount of consumed power in the electric load. The second step determines whether the increase amount of the consumed power exceeds an allowable power that can be supplied to the electric load. The third step controls the change amount of the consumed power to be at most as large as the allowable power, when the increase amount of the consumed power exceeds the allowable power.

Preferably, the third step limits the consumed power.

Preferably, the third step controls a voltage converter converting a first DC voltage being output from DC power source to a second DC voltage such that a voltage level of the second DC voltage being converted from the first DC voltage increases.

Preferably, the third step controls a generator connected in parallel with the electric load such that generated electricity in the generator increases.

Preferably, the first step detects an increase amount of generated electricity power in the electric load being supplied to a voltage converter converting a first DC voltage from the electric load to a second DC voltage having a voltage level different from a voltage level of the first DC voltage. The second step determines whether the detected increase amount of the generated electricity power exceeds a response maximum value of the voltage converter. The third step controls the voltage converter such that the increase amount of the generated electricity power becomes at most as large as the response maximum value of the voltage converter, when the increase amount of the generated electricity power exceeds the response maximum value.

Preferably, the third step controls the voltage converter such that the voltage level of the first DC voltage decreases.

Preferably, the first step includes a first sub-step of detecting an increase amount of consumed power in the electric load, and a second sub-step of detecting an increase amount of generated electricity power in the electric load being supplied to a voltage converter converting a first DC voltage from the electric load to a second DC voltage having a voltage level different from a voltage level of the first DC voltage. The second step includes a third sub-step of determining whether the increase amount of the consumed power exceeds an allowable power that can be supplied to the electric load, and a fourth sub-step of determining whether the detected increase amount of the generated electricity power exceeds a response maximum value of the voltage converter. Further, the third step includes a fifth sub-step of controlling the change amount of the consumed power to be at most as large as the allowable power, when the increase amount of the consumed power exceeds the allowable power, and a sixth sub-step of controlling the voltage converter such that the increase amount of the generated electricity power becomes at most as large as the response maximum value of the voltage converter, when the increase amount of the generated electricity power exceeds the response maximum value.

BEST MODES FOR CARRYING OUT THE INVENTION

Figure 1:
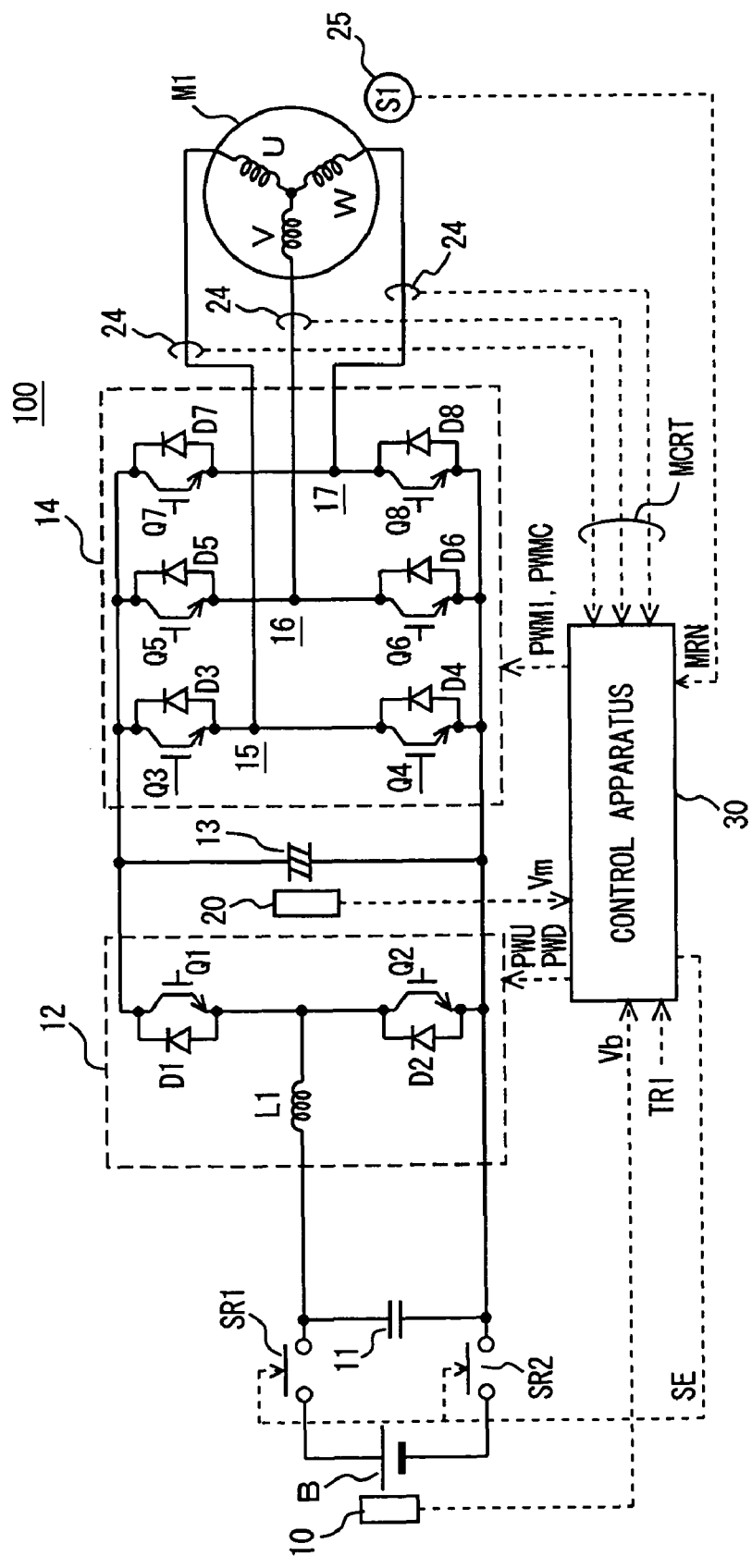
FIG. 1 is a circuit diagram and a block diagram of an electric load apparatus according to the first embodiment.

Referring to the figures, the embodiments of the present invention will be described in detail. In the figures, the identical or the corresponding parts are given the same reference character, and the description thereof will not be repeated.

First Embodiment

Referring to FIG. 1, an electric load apparatus 100 according to the first embodiment of the present invention includes a DC power source B, voltage sensors 10, 20, system relays SR1, SR2, capacitors 11, 13, a DC/DC converter 12, an inverter 14, a current sensor 24, a rotation sensor 25, a control apparatus 30, and an AC motor M1.

AC motor M1, is mounted on, for example, a hybrid vehicle or an electric vehicle. AC motor M1, is a driving motor for producing torque for driving driving wheels of the hybrid vehicle or the electric vehicle. Alternatively, the motor may be incorporated into the hybrid vehicle such that it attains the function of a generator driven by an engine, and operates as an electric motor for the engine, for example, which may be capable of actuating the engine.

DC/DC converter 12 includes a reactor L1, NPN transistors Q1, Q2, and diodes D1, D2. Reactor L1 has its one end connected to the power supply line of DC power source B, and has its other end connected to the intermediate point of NPN transistor Q1 and NPN transistor Q2, i.e., between an emitter of NPN transistor Q1 and a collector of NPN transistor Q2. NPN transistors Q1, Q2 are serially connected between the power supply line and an earth line. NPN transistor Q1 has its collector connected to the power supply line, while NPN transistor Q2 has its emitter connected to the earth line. Between the collectors and emitters of NPN transistors Q1, Q2, diodes D1, D2 for passing current from the emitter side to the collector side are connected, respectively.

Inverter 14 is formed with a U phase arm 15, a V phase arm 16 and a W phase arm 17. U phase arm 15, V phase arm 16, and W phase arm 17 are connected in parallel between the power supply line and the earth line.

U phase arm 15 is formed with serially connected NPN transistors Q3 and Q4. V phase arm 16 is formed with serially connected NPN transistors Q5 and Q6, and W phase arm 17 is formed with serially connected NPN transistors Q7 and Q8. Between the collectors and the emitters of NPN transistors Q3-Q8, diodes D3-D8 for passing current from the emitter side to the collector side are connected, respectively.

The intermediate point of each phase arm is connected to each phase end of each phase coil of AC motor M1. Specifically, MC motor M1 is a three-phase permanent magnet motor, in which each of one ends of three coils U, V, W phase are all connected to the intermediate point, while the other end of U phase coil is connected to the intermediate point of NPN transistors Q3 and Q4, the other end of V phase coil is connected to the intermediate point of NPN transistors Q5 and Q6, and the other end of W phase coil is connected to the intermediate point of NPN transistors Q7 and Q8.

DC power source B is formed with a secondary battery such as a Nickel-Metal Hydride battery and a lithium ion battery. Voltage sensor 10 detects DC voltage Vb output from DC power source B (hereinafter also referred to as "battery voltage Vb"), and outputs thus detected DC voltage Vb to control apparatus 30. System relays SR1, SR2 are turned on/off by a signal SE from control apparatus 30. More specifically, system relays SR1, SR2 are turned on by signal SE of H (logical high) level, and turned off by signal SE of L (logical low) level.

Capacitor 11 smoothes DC voltage Vb supplied from DC power source B, and supplies the smoothed DC voltage Vb to DC/DC converter 12.

DC/DC converter 12 increases DC voltage Vb supplied from capacitor 11 and supplies it to capacitor 13. More specifically, DC/DC converter 12 receives a signal PWU from control apparatus 30, and increases DC voltage Vb in accordance with a period during which NPN transistor Q2 is turned on by signal PWU, and supplies it to capacitor 13.

Further, when DC/DC converter 12 receives signal PWD from control apparatus 30, it decreases DC voltage supplied from inverter 14 via capacitor 13 to charge DC power source B. It is needless to say that DC/DC converter 12 may be applied to circuitry that only performs the voltage boosting function.

Capacitor 13 smoothes DC voltage from DC/DC converter 12, and supplies the smoothed DC voltage to inverter 14. Voltage sensor 20 detects voltage between both ends of capacitor 13, i.e., output voltage Vm of DC/DC converter 12 (corresponding to input voltage of inverter 14: the same holds true for the following), and outputs thus detected output voltage Vm to control apparatus 30.

When supplied with DC voltage from capacitor 13, inverter 14 converts DC voltage to AC voltage based on a signal PWMI from control apparatus 30 to drive AC motor M1. Thus, AC motor M1 is driven to produce the torque specified by a torque instruction value. Further, at the regenerative braking of the hybrid vehicle or the electric vehicle equipped with electric load apparatus 100, inverter 14 converts AC voltage generated by AC motor M1 to DC voltage based on a signal PWMC from control apparatus 30, and supplies thus converted DC voltage to DC/DC converter 12 via capacitor 13. As used herein, the regenerative braking includes a braking operation associated with the regeneration of electricity where the driver of the hybrid vehicle or the electric vehicle operates a foot brake, or deceleration (or stopping acceleration) of the vehicle associated with regeneration of electricity where the driver does not operate the foot brake but turns an accelerator pedal off.

Current sensor 24 detects a motor current MCRT flowing through AC motor M1, and outputs thus detected motor current MCRT to control apparatus 30. In FIG. 1, while current sensor 24 is provided to each of U phase, V phase and W phase of AC motor M1, the present invention is not limited thereto, and current sensor 24 may be provided to at least two of U phase, V phase and W phase.

Rotation sensor 25 detects a motor rotation number MRN of AC motor M1, and outputs thus detected motor rotation number MRN to control apparatus 30.

Control apparatus 30 generates signal PWU for driving DC/DC converter 12 and signal PWMI for driving inverter 14 according to the method described below, based on a torque instruction value TRI that is input from an externally provided ECU (Electrical Control Unit), DC voltage Vb from voltage sensor 10, output voltage Vm from voltage sensor 20, motor current MCRT from current sensor 24, and motor rotation number MRN from rotation sensor 25, and outputs thus generated signals PWU and PWMI to DC/DC converter 12 and inverter 14, respectively.

Signal PWU is a signal for driving DC/DC converter 12 when DC/DC converter 12 converts DC voltage Vb from capacitor 11 to output voltage Vm. Control apparatus 30 generates signal PWU for driving DC/DC converter 12 when DC/DC converter 12 converts DC voltage Vb to output voltage Vm, in order to feedback control output voltage Vm such that output voltage Vm attains voltage instruction Vdccom as instructed. A method for generating signal PWU will be described in detail later.

Additionally, when control apparatus 30 receives from external ECU a signal indicating that the hybrid vehicle or the electric vehicle enters the regenerative braking mode, it generates signal PWMC for converting AC voltage generated by AC motor M1 to DC voltage, and outputs it to inverter 14. In this case, NPN transistors Q3-Q8 of inverter 14 are switching-controlled by signal PWMC. Thus, inverter 14 converts AC voltage generated by AC motor M1 to DC voltage, and supplies it to DC/DC converter 12.

Further, when control apparatus 30 receives from external ECU a signal indicating that the hybrid vehicle or the electric vehicle enters the regenerative braking mode, it generates signal PWD for decreasing DC voltage supplied from inverter 14, and outputs thus generated signal PWD to DC/DC converter 12. Thus, AC voltage generated by AC motor M1 is converted to DC voltage, decreased and supplied to DC power source B.

Still further, control apparatus 30 determines if an increase amount of the consumed power in AC motor M1 exceeds an allowable power that can be supplied from capacitor 13 to inverter 14 for driving AC motor M1, based on DC voltage Vb from voltage sensor 10, output voltage Vm from voltage sensor 20, motor current MCRT from current sensor 24, and motor rotation number MRN from rotation sensor 25. Then, when the increase amount of the consumed power exceeds the allowable power, control apparatus 30 controls DC/DC converter 12 by the method that will be described later to suppress the increase amount of the consumed power in AC motor M1. When the increase amount of the consumed power does not exceed the allowable power, control apparatus 30 keeps the control of DC/DC converter 12 in the same manner.

Still further, control apparatus 30 generates signal SE for turning on/off system relays SR1, SR2, and outputs it to system relays SR1, SR2.

Figure 2:
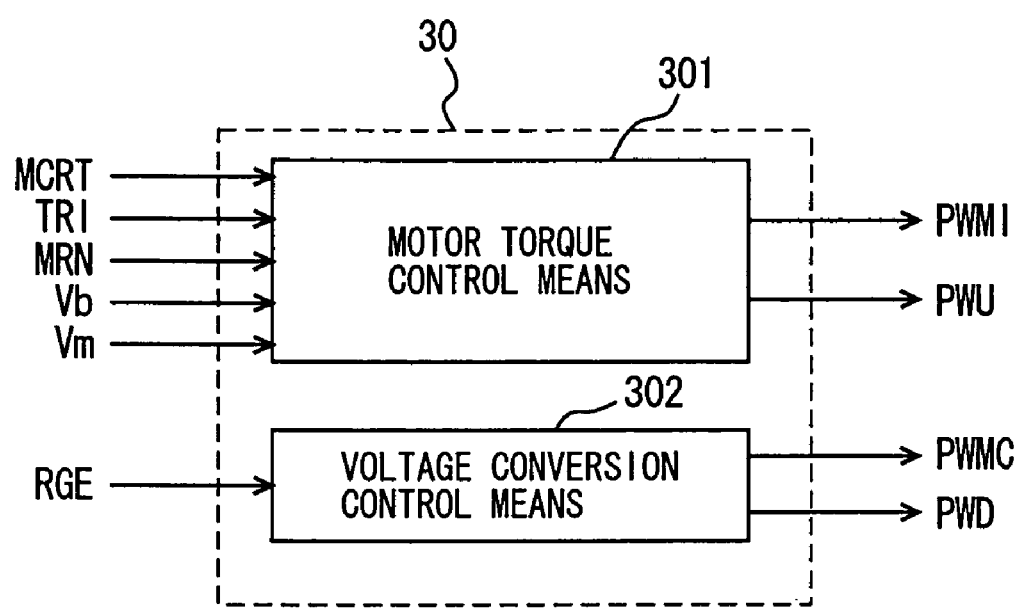
FIG. 2 is a block diagram of a control apparatus shown in FIG. 1.

FIG. 2 is a functional block diagram of control apparatus 30. Referring to FIG. 2, control apparatus 30 includes motor torque control means 301 and voltage conversion control means 302. Motor torque control means 301 generate signal PWU for turning on/off NPN transistors Q1, Q2 of DC/DC converter 12 and signal PWMI for turning on/off NPN transistors Q3-Q8 of inverter 14 according to the method described below when driving AC motor M1, based on torque instruction value TRI (an acceleration pedal stroke amount in a vehicle: in the hybrid vehicle, obtained by calculating a torque instruction to be provided to the motor considering the operating state of the engine), DC voltage Vb output from DC power source B, motor current MCRT, motor rotation number MRN and output voltage Vm of DC/DC converter 12. Then, motor torque control means 301 output thus generated signals PWU and PWMI to DC/DC converter 12 and inverter 14, respectively.

Motor torque control means 301 calculate torque in AC motor M1 for each prescribed timing based on motor current MCRT. The torque in AC motor M1 is proportional to motor current MCRT passing through each phase of AC motor M1. Therefore, motor torque control means 301 calculate the torque in AC motor M1 by multiplying a prestored proportionality constant by motor current MCRT received from current sensor 24. Then, motor torque control means 301 calculate the increase amount of the consumed power in AC motor M1 in a period from the previous timing until the current timing, using the torque calculated for each timing and motor rotation number MRN input from rotation sensor 25 for each timing. Further, motor torque control means 301 calculate an allowable power that can be supplied from capacitor 13 to inverter 14, based on DC voltage Vb and output voltage Vm.

Then, motor torque control means 301 determine if thus calculated increase amount of the consumed power exceeds thus calculated allowable power. When the increase amount of the consumed power exceeds the allowable power, motor torque control means 301 controls DC/DC converter 12 to suppress the increase amount of the consumed power in AC motor M1. More specifically, motor torque control means 301 generate a signal PWUc (one type of signal PWU) for driving DC/DC converter 12 to suppress the increase amount of the consumed power in AC motor M1, and outputs thus generated signal PWUc to DC/DC converter 12. When the increase amount of the consumed power does not exceed the allowable power, motor torque control means 301 keep the control of DC/DC converter 12 in the same manner.

In the regenerative braking mode, when voltage converter control means 302 receive from the external ECU a signal RGE indicating that the hybrid vehicle or the electric vehicle enters the regenerative braking mode, it generate signal PWMC for converting AC voltage generated by AC motor M1 to DC voltage, and output it to inverter 14.

Additionally, in the regenerative braking mode, when voltage conversion control means 302 receive from the external ECU signal RGE, it generate signal PWD for decreasing DC voltage supplied from inverter 14, and output it to DC/DC converter 12. Accordingly, DC/DC converter 12 is capable of decreasing DC voltage by signal PWD for decreasing DC voltage, and therefore it has a function of a bidirectional converter.

Figure 3:
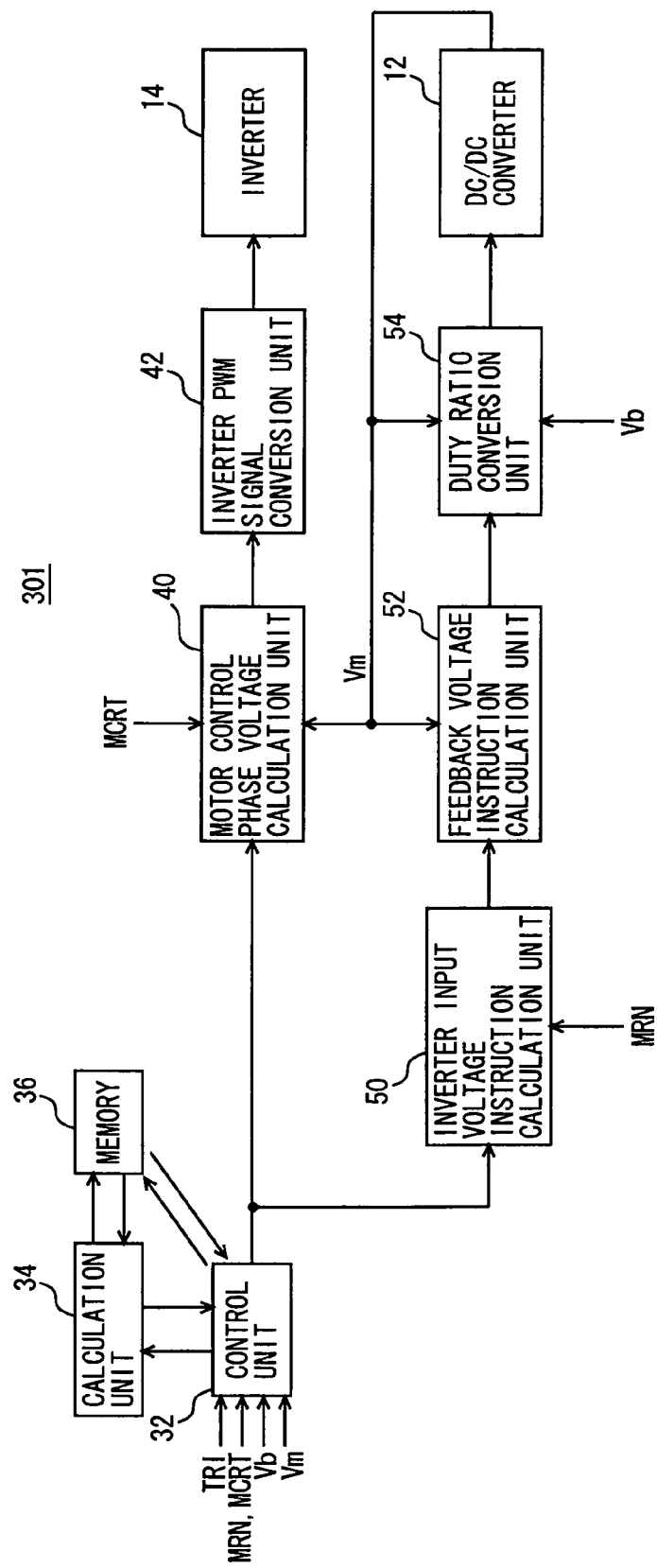
FIG. 3 is a block diagram of a motor torque control means shown in FIG. 2.

FIG. 3 is s functional block diagram of motor torque control means 301. Referring to FIG. 3, motor torque control means 301 include a control unit 32, an calculation unit 34, a memory 36, a motor control phase voltage calculation unit 40, an inverter PWM signal conversion unit 42, an inverter input voltage instruction calculation unit 50, a feedback voltage instruction calculation unit 52, and a duty ratio conversion unit 54.

When control unit 32 receives torque instruction value TRI from the external ECU, it outputs thus received torque instruction value TRI to motor control phase voltage calculation unit 40 and inverter input voltage instruction calculation unit 50.

Additionally, control unit 32 stores DC voltage Vb, output voltage Vm, motor rotation number MRN and motor current MCRT input for each timing, in memory 36. Then, for each timing of controlling DC/DC converter 12, control unit 32 controls calculation unit 34 such that it calculates a limit value W of the allowable power that can be supplied from capacitor 13 to inverter 14, an allowable power W0 that can be supplied from capacitor 13 to inverter 14, torque Tm(n) of AC motor M1 for each timing, rotation angular speed ωm(n) of AC motor M1 for each timing, change rate P' of the consumed power of AC motor M1 for each timing, and a change amount Psm of the consumed power of AC motor M1 between two successive timings, based on DC voltage Vb, output voltage Vm, motor rotation number MRN and motor current MCRT, and then stores the calculation result in memory 36.

Further, at timing t, control unit 32 receives allowable power W0 and increase amount Psm of the consumed power from calculation unit 34, and determines if increase amount Psm of the consumed power exceeds allowable power W0. Then, when increase amount Psm of the consumed power exceeds allowable power W0, control unit 32 controls calculation unit 34 such that it calculates torque instruction at timing t for suppressing increase amount of the consumed power in AC motor M1. Then, control unit 32 outputs the torque instruction received from calculation unit 34 to inverter input voltage instruction calculation unit 50. When increase amount Psm of the consumed power does not exceed allowable power W0, control unit 32 reads torque Tm(n) at timing t, and outputs thus read torque Tm(n) to inverter input voltage instruction calculation unit 50 as the torque instruction at timing t.

Calculation unit 34 reads motor current MCRT and motor rotation number MRN from memory 36 for each timing, and calculates torque Tm(n) and rotation angular speed ωm(n) using thus read motor current MCRT and motor rotation number MRN, respectively.

Additionally, calculation unit 34 reads DC voltage Vb, output voltage Vm, motor rotation number MRN and motor current MCRT from memory 36 in accordance with the control from control unit 32. Then, calculation unit 34 calculates allowable power limit value W that can be supplied from capacitor 13 to inverter 14 by the following expression:

$$W = \frac{1}{2}CVm^2 - \frac{1}{2}CVb^2 \qquad (1)$$

where C is a capacitance of capacitor 13. The circuit of DC/DC converter 12 shown in FIG. 1 is capable of increasing DC voltage Vb to output voltage Vm only for the period in which the relationship of Vm>Vb is satisfied. Therefore, DC voltage Vb, output voltage Vm and limit value W of the allowable power satisfy the relationship of expression (1).

Additionally, calculation unit 34 calculates torque Tm(n) of AC motor M1 for each instruction time based on motor current MCRT read from memory 36, and calculates rotation angular speed ωm(n) for each instruction time based on motor rotation number MRN read from memory 36. Then, calculation unit 34 stores thus calculated torque Tm(n) and rotation angular speed ωm(n) in memory 36.

Further, calculation unit 34 reads from memory 36 torque Tm(n−1) calculated from motor current MCRT of AC motor M1 at the previous instruction time t−1 and rotation angular speed ωm(n−1) calculated from motor rotation number MRN at the previous instruction time t−1, and calculates a change amount ΔT of torque and a change amount Δωm of rotation angular speed in a period Δt, which is from the previous instruction time t−1 to the current instruction time t. Then, calculation unit 34 calculates increase rate P′ of the consumed power in AC motor M1 in period Δt that is from the previous instruction time t−1 to the current instruction time t by the following expression, using thus calculated change amount ΔT of torque and change amount Δωm of rotation angular speed:

$$P' = \frac{\Delta P}{\Delta t} = \frac{1}{\Delta t}(\Delta T \cdot \overline{\omega}m + \Delta\overline{\omega}m \cdot T) \quad (2)$$

where T is the torque at the current instruction time, and ωm is the rotation angular speed at the current instruction time.

More specifically, calculation unit 34 calculates increase rate P′ of the consumed power in AC motor M1 by using the following expression:

$$\Delta P = (Tm(n) - Tm(n-1)) \cdot \overline{\omega}m(n) + (\overline{\omega}m(n) - \overline{\omega}m(n-1)) \cdot Tm(n) \quad (3)$$

In expression (3), Tm(n) is the torque calculated based on motor current MCRT at the current instruction time t, while ωm(n) is the rotation angular speed calculated based on motor rotation number MRN at the current instruction time t. Alternatively, calculation unit 34 may calculate increase rate P′ of the consumed power using reactor current flowing through reactor L1 and battery voltage Vb.

Further, calculation unit 34 calculates increase amount Psm of the consumed power by the following expression:

$$Psm = P' \cdot tf \quad (4)$$

Expression (4) shows that the consumed power where increase rate P′ of the consumed power in AC motor M1 at time point t is maintained during control response time constant tf of DC/DC converter 12 is equal to increase amount Psm of the consumed power.

Still further, calculation unit 34 calculates an allowable power W0 by multiplying a limit value W of the allowable power by coefficient G (0<G<1) in accordance with the control from control unit 32.

Still further, when increase amount Psm of the consumed power exceeds allowable power W0, calculation unit 34 calculates torque instruction T′m(n) at the current instruction time t in accordance with the control from control unit 32 by the following expression:

$$T'm(n) = T'm(n-1) + \frac{Po}{\overline{\omega}m} \cdot K \quad (5)$$

where T′m(n−1) is the torque instruction at the previous instruction time. Further, P0=W0/tf, while K is a coefficient of a predetermined value.

Memory 36 stores DC voltage Vb, output voltage Vm, motor rotation number MRN, motor current MCRT, torque Tm(n) calculated based on motor current MCRT, rotation angular speed ωm(n), torque instruction T′m(n), coefficients G, K and control response time constant tf, for each timing.

Motor control phase voltage calculation unit 40 receives output voltage Vm of DC/DC converter 12 (i.e., capacitor 13) from voltage sensor 20, receives motor current MCRT flowing through each phase of AC motor M1 from current sensor 24, and receives torque instruction value TR from control unit 32. Then, motor control phase voltage calculation unit 40 calculates the voltage to be applied to the coil of each phase of AC motor M1 based on those signals being input, and supplies thus calculated results to inverter PWM signal conversion unit 42.

Inverter PWM signal conversion unit 42 generates signal PWMI that practically turns on/off each NPN transistor Q3-Q8 of inverter 14 based on the calculation result received from motor control phase voltage calculation unit 40, and outputs thus generated signal PWMI to each NPN transistor Q3-Q8 of inverter 14.

Thus, each NPN transistor Q3-Q8 is switching-controlled, and controls the current passing through each phase of AC motor M1 such that AC motor M1 produces the torque as instructed. Thus, motor driving current is controlled, and motor torque corresponding to torque instruction value TR is output.

Inverter input voltage instruction calculation unit 50 calculates the optimum value of inverter input voltage (target value), i.e., voltage instruction Vdccom based on torque instruction value TR and motor rotation number MRN, and outputs thus calculated voltage instruction Vdccom to feedback voltage instruction calculation unit 52.

Feedback voltage instruction calculation unit 52 calculates feedback voltage instruction Vdccom_fb, based on output voltage Vm of DC/DC converter 12 from voltage sensor 20 and voltage instruction Vdccom from inverter input voltage instruction calculation unit 50, and outputs thus calculated feedback voltage instruction Vdccom_fb to duty ratio conversion unit 54.

Duty ratio conversion unit 54 calculates the duty ratio for setting output voltage Vm from voltage sensor 20 to feedback voltage instruction Vdccom_fb from feedback voltage instruction calculation unit 52, based on battery voltage Vb from voltage sensor 10 and feedback voltage instruction Vdccom_fb from feedback voltage instruction calculation unit 52, and generates signal PWU for turning on/off NPN transistors Q1, Q2 of DC/DC converter 12 based on thus calculated duty ratio. Then, duty ratio conversion unit 54 outputs thus generated signal PWU to NPN transistors Q1, Q2 of DC/DC converter 12.

It should be noted that, if the on-duty of the lower NPN transistor Q2 of DC/DC converter 12 is increased, then the electricity storage of reactor L1 increases, and hence output of higher voltage can be obtained. On the other hand, if the on-duty of upper NPN transistor Q1 is increased, then the voltage of the power supply line decreases. Accordingly, by controlling the duty ratio of NPN transistors Q1, Q2, the voltage of the power supply line can be controlled to any voltage at least at the output voltage of DC power source B.

Figure 4:
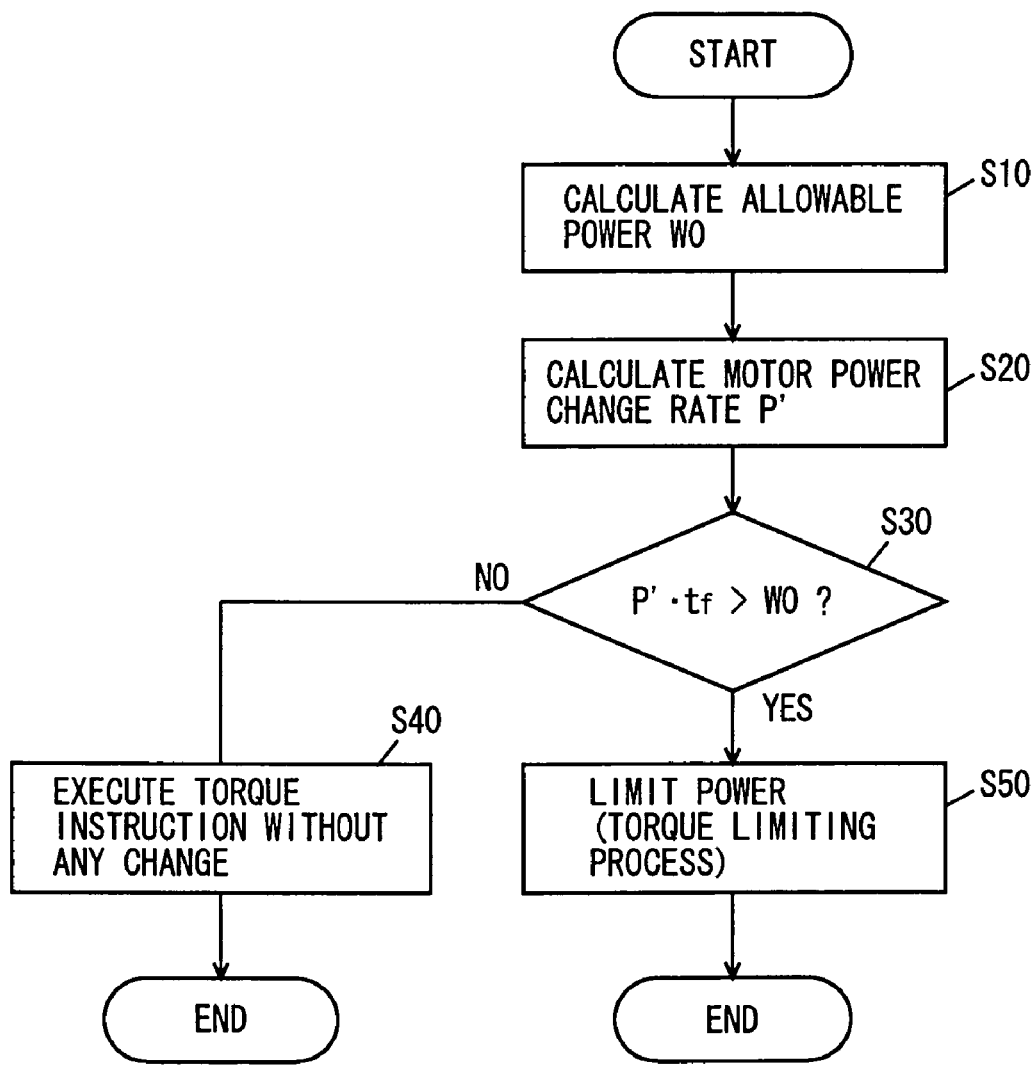
FIG. 4 is a flow chart for describing an operation of controlling an increase amount of consumed power according to the first embodiment.

Referring to FIG. 4, description will be made on operations for maintaining the driving operation of electric load apparatus 100 based on consumed power in inverter 14 and AC motor M1 as electric loads. When a sequence of operations is started, calculation unit 34 calculates allowable power W0 using expression (1) and coefficient G (step S10). Then, calculation unit 34 calculates increase rate P′ of the consumed power in AC motor M1 in a period ωt that is from previous instruction time t−1 to current instruction time t by expression (2) (more specifically, expression (3)) (step S20). Thereafter, calculation unit 34 calculates increase amount Psm of the consumed power by expression (4) using control response time constant tf of DC/DC converter 12 and increase rate P' of the consumed power calculated at step S20.

Then, control unit 32 receives allowable power W0 and increase amount Psm of the consumed power from calculation unit 34, and determines if increase amount Psm of the consumed power (=P'×tf) exceeds allowable power W0 (step S30).

DC voltage Vb output from DC power source B, output voltage Vm of capacitor 13, and limit value W of the allowable power that can be supplied from capacitor 13 to inverter 14 satisfy the relationship shown by expression (1). Then, in order to constantly satisfy the relationship of Vm>Vb and to prevent energetic failure, the power transferred from capacitor 13 to inverter 14 during control response time constant tf of DC/DC converter 12 must be at least smaller than the limit value W.

Therefore, in order to prevent energetic failure, allowable power W0 is calculated by multiplying limit value W of the allowable power by coefficient G (0<G<1), and it is determined if increase amount Psm of the consumed power (=P'×tf) in AC motor M1 is greater than allowable power W0.

At step S30, if increase amount Psm of the consumed power is determined to be not greater than allowable power W0, then control unit 32 determines that it is not necessary to limit the consumed power in inverter 14 and AC motor M1 as electric loads, and outputs torque Tm(n) calculated based on motor current MCRT at the current instruction time to inverter input voltage instruction calculation unit 50 as torque instruction value TR.

Then, inverter input voltage instruction calculation unit 50 calculates voltage instruction Vdccom based on torque instruction value TR (=Tm(n)) and motor rotation number MRN, and outputs it to feedback voltage instruction calculation unit 52. Feedback voltage instruction calculation unit 52 calculates feedback voltage instruction Vdccom_fb based on voltage instruction Vdccom and output voltage Vm of DC/DC converter 12, and outputs it to duty ratio conversion unit 54. Then, duty ratio conversion unit 54 calculates the duty ratio for setting output voltage Vm to feedback voltage instruction Vdccom_fb from feedback voltage instruction calculation unit 52 based on feedback voltage instruction Vdccom_fb, output voltage Vm and DC voltage Vb, and generates signal PWU for turning on/off NPN transistors Q1, Q2 of DC/DC converter 12 based on thus calculated duty ratio. Then, duty ratio conversion unit 54 outputs thus generated signal PWU to NPN transistors Q1, Q2 of DC/DC converter 12. Thus, the control for AC motor M1 to output torque Tm(n) at the current instruction time is executed without any change (step S40).

On the other hand, at step S30 if increase amount Psm of the consumed power (P'×tf) is determined to exceed allowable power W0, control unit 32 determines that it is necessary to limit the consumed power in inverter 14 and AC motor M1 as electric loads, and controls calculation unit 34 such that it calculates torque instruction T'm(n). Then, calculation unit 34 calculates torque instruction T'm(n) by expression (5) to be output to control unit 32, while control unit 32 outputs torque instruction T'm(n) to inverter input voltage instruction calculation unit 50.

Then, inverter input voltage instruction calculation unit 50 calculates voltage instruction Vdccomc based on torque instruction value TR (=T'm(n)) and motor rotation number MRN to be output to feedback voltage instruction calculation unit 52, while feedback voltage instruction calculation unit 52 calculates feedback voltage instruction Vdccom_fb_c based on voltage instruction Vdccomc and output voltage Vm of DC/DC converter 12 to be output to duty ratio conversion unit 54. Then, duty ratio conversion unit 54 calculates the duty ratio for setting output voltage Vm to feedback voltage instruction Vdccom_fb_c from feedback voltage instruction calculation unit 52 based on feedback voltage instruction Vdccom_fb_c, output voltage Vm and DC voltage Vb, and generates signal PWUc for turning on/off NPN transistors Q1, Q2 of DC/DC converter 12 based on thus calculated duty ratio. Then, duty ratio conversion unit 54 outputs thus generated signal PWUc to NPN transistors Q1, Q2 of DC/DC converter 12. Thus, the consumed power (torque) in AC motor M1 is limited (step S50).

The process for limiting consumed power in AC motor M1 is, more specifically, performed by setting appropriate coefficient K for each case as follows.

When first term $\Delta T \cdot \omega m$ > second term $\Delta \omega m \cdot T$ in the right side of expression (2), coefficient K is set to be 0<K<1, and the increase amount of torque instruction at the current instruction time is limited such that increase amount Psm of the consumed power does not exceed allowable power W0.

Additionally, when first term $\Delta T \cdot \omega m$ < second term $\Delta \omega m \cdot T$ in the right side of expression (2), coefficient K is set to be −1<K <1, and the control for decreasing torque is also allowed such that $\Delta \omega m$ becomes smaller. In this case, coefficient K may be set to be −1<K<0, and the control that only allows torque to be decreased may be executed. Thus, when the effect of $\Delta \omega m$ is great, not only the abrupt change of rotation number can be suppressed, but also the voltage drop due to regenerative operation can be recovered.

Expression (5) shows that addition of $(P0/\omega m) \times K$ to previous torque instruction T'm(n−1) provides current torque instruction T'm(n). Then, $(P0/\omega m) \times K$ to be added to previous torque instruction T'm(n−1) can be obtained by multiplying allowable power W0 that can be supplied from capacitor 13 to inverter 14 by coefficient K having a value less than 1.

Therefore, the torque to be increased at the current instruction time can be realized by allowable power W0 that can be supplied from capacitor 13 to inverter 14. Specifically, in the present invention, when increase amount Psm of the consumed power in AC motor M1 exceeds allowable power W0 that can be supplied from capacitor 13 to inverter 14, the increase amount of torque (consumed power) in AC motor M1 is limited in a range that can be realized by allowable power W0.

It should be noted that, the process of limiting consumed power (torque) at step S50 corresponds to controlling the increase amount of the consumed power in inverter 14 and AC motor M1 as electric loads to be set in a range in which the driving operation of the electric loads (i.e., inverter 14 and AC motor M1,) can be maintained.

Then, after step S40 or step S50, the sequence of operations ends.

Figure 5A:
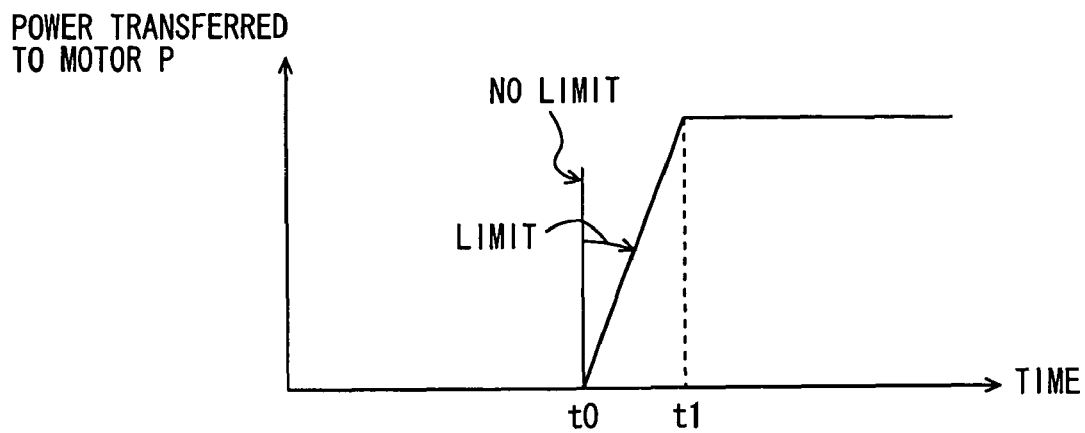
FIGS. 5A, 5B and 5C show the states of voltage and power when consumed power in an electric load abruptly changes.
Figure 5B:
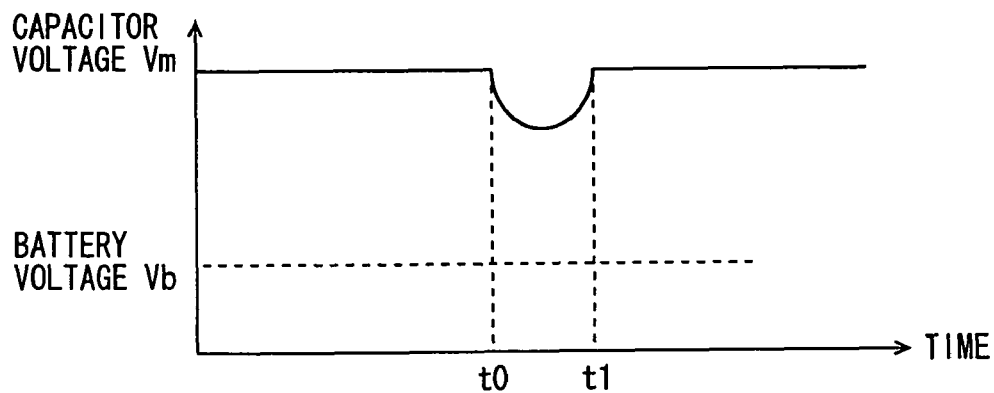
Figure 5C:
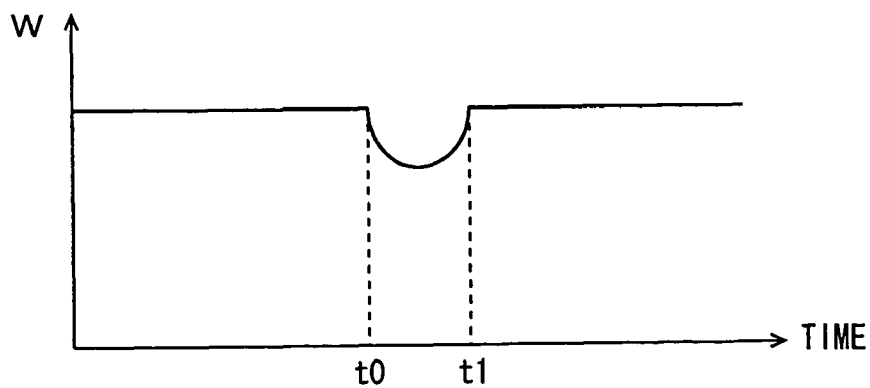

FIGS. 5A, 5B and 5C indicate the states of voltage and consumed power when the consumed power abruptly changes in the electric loads (i.e., inverter 14 and AC motor M1,). Referring to FIGS. 5A, 5B and 5C, the consumed power P of AC motor M1 abruptly changes at time point t0. When this abrupt change is detected by control apparatus 30, consumed power P is limited, and consequently, output voltage Vm of capacitor 13 transits at least at battery voltage Vb. It should be noted that after time point t0, where the abrupt change of the consumed power in the electric loads is resolved, consumed power P is not limited.

As above, when rotation number of AC motor M1 abruptly changes, reduction in output voltage Vm of DC/DC converter 12 and occurrence of overcurrent can be prevented by limiting the consumed power.

Additionally, since it is not necessary to design the circuit of DC/DC converter 12 to withstand the overcurrent, the capacity (allowable current) of DC/DC converter 12 can be made smaller.

Further, since it is not necessary to design capacitor 13 to withstand the abrupt change of the consumed power in inverter 14 and AC motor M1, the capacity of capacitor 13 can be made smaller. As a result, the cost reduction may be achieved.

Again, referring to FIG. 1, operations in electric load apparatus 100 are described. When torque instruction value TRI is input from the external ECU, control apparatus 30 generates signal SE of H level for turning on system relays SR1, SR2, and outputs it to system relays SR1, SR2. Control apparatus 30 also generates signals PWU and PWMI for controlling DC/DC converter 12 and inverter 14 such that AC motor M1 produces torque instruction value TRI, and outputs them to DC/DC converter 12 and inverter 14, respectively.

Then, DC power source B outputs DC voltage Vb, and system relays SR1, SR2 supply DC voltage Vb to capacitor 11. Capacitor 11 smoothes thus supplied DC voltage Vb, and supplies thus smoothed DC voltage Vb to DC/DC converter 12.

Then, NPN transistors Q1, Q2 of DC/DC converter 12 are turned on/off in accordance with signal PWU from control apparatus 30 to convert DC voltage Vb to output voltage Vm, and supply it to capacitor 13. Voltage sensor 20 detects output voltage Vm of capacitor 13, and outputs thus detected output voltage Vm to control apparatus 30.

Capacitor 13 smoothes DC voltage supplied from DC/DC converter 12 and supplies it to inverter 14. NPN transistors Q3-Q8 of inverter 14 are turned on/off in accordance with signal PWMI from control apparatus 30, while inverter 14 converts DC voltage to AC voltage, and passes a prescribed AC current to each of U phase, V phase, and W phase of AC motor M1, such that AC motor M1 produces the torque specified by torque instruction value TRI. Thus, AC motor M1 produces the torque specified by torque instruction value TRI.

Then, control apparatus 30 receives, for each timing with prescribed intervals, DC voltage Vb from DC power source B, output voltage Vm of capacitor 13, motor rotation number MRN of AC motor M1, and motor current MCRT of AC motor M1, and controls to maintain the driving operation of the electric loads based on thus received DC voltage Vb, output voltage Vm, motor rotation number MRN and motor current MCRT even when the consumed power in the electric loads abruptly increases.

Specifically, control apparatus 30 calculates allowable power W0 that can be supplied from capacitor 13 to inverter 14, increase rate P' of the consumed power in AC motor M1, and increase amount Psm of the consumed power in AC motor M1, based on DC voltage Vb, output voltage Vm, motor rotation number MRN and motor current MCRT. Then, control apparatus 30 determines whether increase amount Psm of the consumed power exceeds allowable power W0, and when increase amount Psm of the consumed power does not exceed allowable power W0, it controls DC/DC converter 12 to realize the torque instruction at the current instruction time without any change.

On the other hand, when increase amount Psm of the consumed power exceeds allowable power W0, control apparatus 30 controls DC/DC converter 12 to limit consumed power (torque) in inverter 14 and AC motor M1 as electric loads. Thus, even when the consumed power in the electric loads (i.e., inverter 14 and AC motor M1,) changes to the extent that may have stopped the driving operation of the electric loads, the increase amount of the consumed power is controlled to be set in a range in which the driving operation of the electric loads can be maintained.

When the hybrid vehicle or the electric vehicle equipped with electric load apparatus 100 enters the regenerative braking mode, control apparatus 30 receives from the external ECU a signal indicating that the regenerative braking mode is entered, and generates signals PWMC and PWD to be output to inverter 14 and DC/DC converter 12, respectively.

AC motor M1 generates AC voltage, and the generated AC voltage is supplied to inverter 14. Then, inverter 14 converts AC voltage to DC voltage in accordance with signal PWMC from control apparatus 30, and supplies thus converted DC voltage to DC/DC converter 12 via capacitor 13.

DC/DC converter 12 decreases DC voltage in accordance with signal PWD from control apparatus 30 and supplies it to DC power source B to charge DC power source B.

Note that inverter 14 and AC motor M1 form "electric loads" in the present invention.

The electric load controlling method according to the present invention is the electric load controlling method for controlling the increase amount of the consumed power in an electric load to be set in a range in which the driving operation of the voltage converter (i.e., DC/DC converter 12) is maintained in accordance with the flow chart of FIG. 4.

Further, allowable power W0 corresponds to "limit value" that is the maximum value of a change amount of power in the electric loads (inverter 14 and AC motor M1,) in which the driving operation of the electric loads can be maintained.

Still further, diodes D1, D2 form "flywheel diodes".

Still further, the control of the increase amount of the consumed power in control unit 32, calculation unit 34, inverter input voltage instruction calculation unit 50, feedback voltage instruction calculation unit 52 and the duty ratio conversion unit 54 is practically performed by CPU (Central Processing Unit), where CPU reads a program including each step of the flow chart of FIG. 4 from ROM (Read Only Memory), and executes thus read program to control the increase amount of the consumed power in electric loads to be set in a range in which the driving operation of the electric loads can be maintained in accordance with the flow chart of FIG. 4. Therefore, ROM corresponds to the computer (CPU) readable recording medium recording a program including each step of the flow chart of FIG. 4.

Still further, the method of detecting the abrupt increase of the consumed power in the electric loads is not limited to the method described above, and it may be performed by monitoring the change in output voltage Vm of DC/DC converter 12, or by monitoring the change according to time in the acceleration pedal stroke amount of the electric vehicle (if the acceleration pedal stroke amount is approximately proportional to the consumed power).

According to the first embodiment, the electric load apparatus includes the DC/DC converter increasing the DC voltage from the DC power source to the output voltage, the inverter driving the AC motor by the output voltage of the DC/DC converter, and the control apparatus controlling the increase amount of the consumed power in the inverter and AC motor as the electric loads when the increase amount of the consumed power in the electric loads exceeds the allowable power that can be supplied to the electric loads, such that the driving operation of the DC/DC converter is maintained. Therefore, the driving operation of the electric loads can be continued stably even when the consumed power changes to the extent that may have stopped the driving operation of the electric loads.

Second Embodiment

Figure 6:
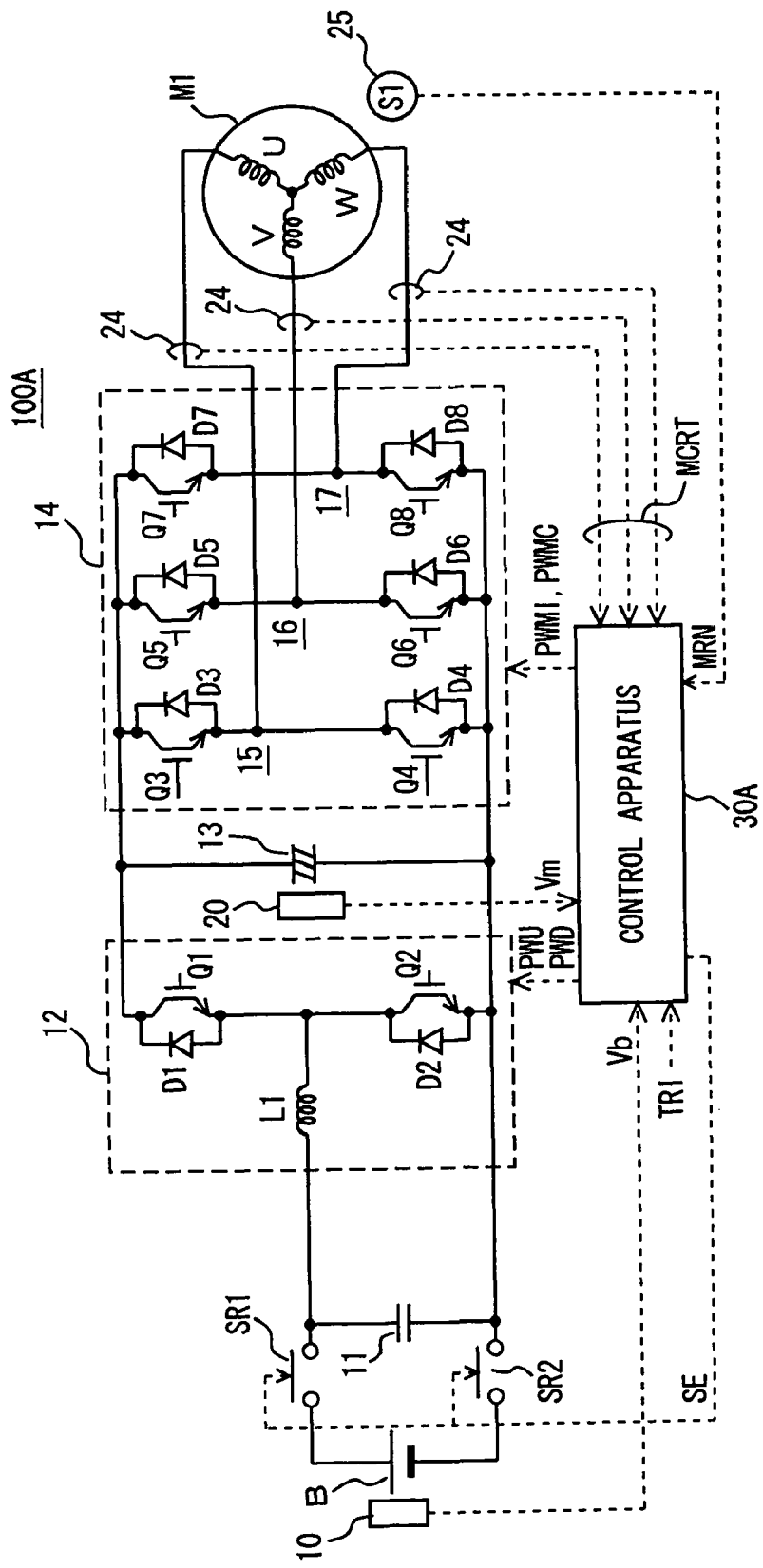
FIG. 6 is a circuit diagram and a block diagram of an electric load apparatus according to the second embodiment.

Referring to FIG. 6, in an electric load apparatus 100A according to the second embodiment, control apparatus 30 of electric load apparatus 100 is replaced by a control apparatus 30A, while the rest of the configuration of electric load apparatus 100A is identical to that of electric load apparatus 100. Control apparatus 30A controls DC/DC converter 12 by increasing a voltage instruction value when the consumed power Psm in AC motor M1 exceeds allowable power W0. The rest of the function of control apparatus 30A is identical to that of control apparatus 30.

Figure 7:
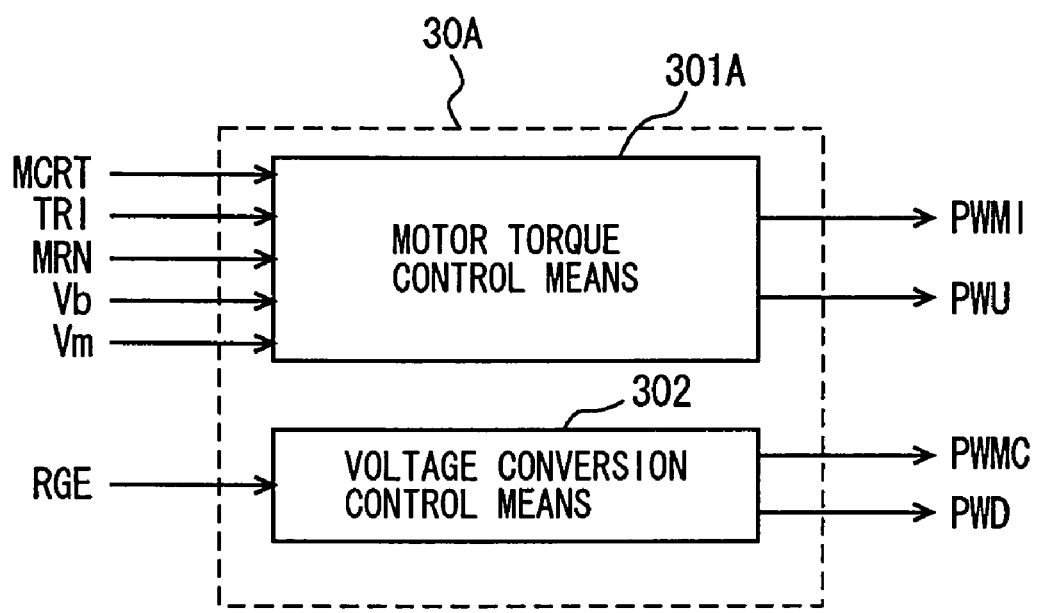
FIG. 7 is a block diagram of a control apparatus shown in FIG. 6.

Referring to FIG. 7, in control apparatus 30A, motor torque control means 301 of control apparatus 30 is replaced by motor torque control means 301A, while the rest of the configuration of control apparatus 30A is identical to that of control apparatus 30.

The only difference between motor torque control means 301A and motor torque control means 301 is the method of controlling increase amount Psm of the consumed power for maintaining the driving operation of DC/DC converter 12 when increase amount Psm of the consumed power in AC motor M1 exceeds allowable power W0. The rest of the feature is identical to that of motor torque control means 301. Motor torque control means 301A maintains the driving operation of DC/DC converter 12 by increasing voltage instruction Vdccom of output voltage Vm, when increase amount Psm of the consumed power of AC motor M1 exceeds allowable power W0.

Figure 8:
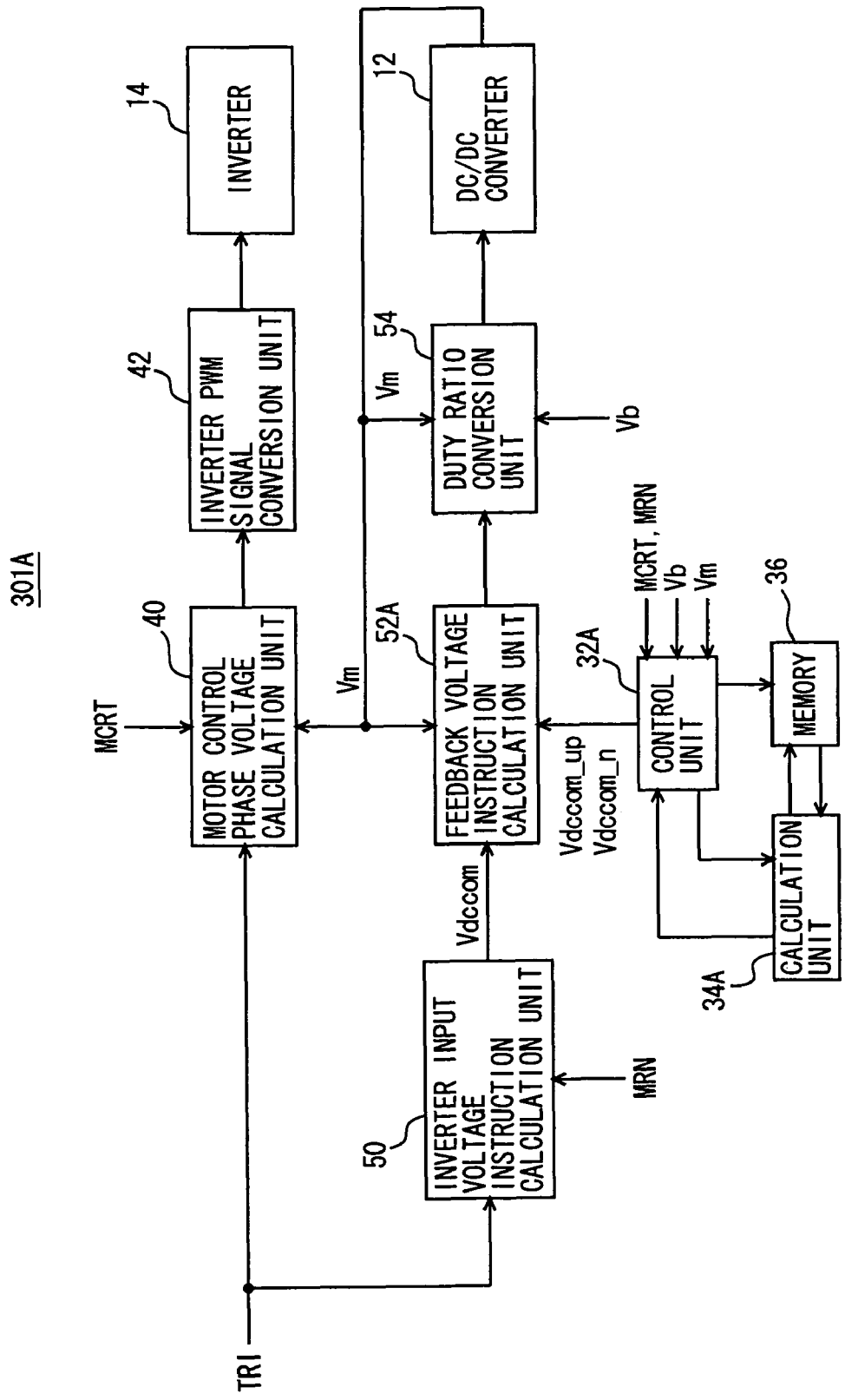
FIG. 8 is a block diagram of a motor torque control means shown in FIG. 7.

Referring to FIG. 8, in motor torque control means 301A, control unit 32, calculation unit 34 and feedback voltage instruction calculation unit 52 of motor torque control means 301 are replaced by control unit 32A, calculation unit 34A and feedback voltage instruction calculation unit 52A, respectively, while the rest of the configuration is identical to that of motor torque control means 301.

Control unit 32A includes the following function, in addition to the function of control unit 32. When control unit 32A determines that increase amount Psm of the consumed power in AC motor M1 exceeds allowable power W0, it controls calculation unit 34A such that it calculates voltage instruction Vdccom_up to be output to feedback voltage instruction calculation unit 52A at the current instruction time. Then, control unit 32A outputs voltage instruction Vdccom_up calculated by calculation unit 34A to feedback voltage instruction calculation unit 52A.

Further, when control unit 32A determines that increase amount Psm of the consumed power in AC motor M1 does not exceed allowable power W0, it controls calculation unit 34A such that it calculates voltage instruction Vdccom_n for realizing torque Tm(n) calculated based on motor current MCRT at the current instruction time.

Calculation unit 34A includes the following function in addition to the function of calculation unit 34. Calculation unit 34A calculates voltage instruction Vdccom_up or voltage instruction Vdccom_n at the current instruction time, in accordance with the control from control unit 32A.

Calculation unit 34A reads DC voltage Vb and increase amount Psm (=P'·tf) of the consumed power from memory 36, and calculates voltage instruction Vdccom_up at the current instruction time by the following expression:

$$\frac{1}{2}C(\text{Vdccom\_up})^2 - \frac{1}{2}CVb^2 > P' \cdot tf \quad (6)$$

Expression (6) shows that the power that can be supplied from capacitor 13 to inverter 14 when output voltage Vm of DC/DC converter 12 is increased to voltage instruction Vdccom_up is greater than increase amount Psm (=P'·tf) of the consumed power. Accordingly, by increasing output voltage Vm of DC/DC converter 12 to voltage instruction Vdccom_up, the driving operation of electric load apparatus 100A can be maintained even when the consumed power in AC motor M1 is increased by Psm.

Additionally, calculation unit 34A reads torque Tm(n) and motor rotation number MRN at the current instruction time to calculate voltage instruction Vdccom_n.

Then, calculation unit 34A outputs thus calculated voltage instruction Vdccom_up or Vdccom_n to control unit 32A.

When feedback voltage instruction calculation unit 52A receives voltage instruction Vdccom from inverter input voltage instruction calculation unit 50, it calculates feedback voltage instruction Vdccom_fb, based on thus received voltage instruction Vdccom and output voltage Vm of DC/DC converter 12 from voltage sensor 20, and outputs thus calculated feedback voltage instruction Vdccom_fb to duty ratio conversion unit 54.

Additionally, when feedback voltage instruction calculation unit 52A receives voltage instruction Vdccom_up from control unit 32A, it calculates feedback voltage instruction Vdccom_fb_up based on thus received voltage instruction Vdccom_up and output voltage Vm from voltage sensor 20, and outputs thus calculated feedback voltage instruction Vdccom_fb_up to duty ratio conversion unit 54.

Further, when feedback voltage instruction calculation unit 52A receives voltage instruction Vdccom_n from control unit 32A, it calculates feedback voltage instruction Vdccom_fb_n based on thus received voltage instruction Vdccom_n and output voltage Vm from voltage sensor 20, and outputs thus calculated feedback voltage instruction Vdccom_fb_n to duty ratio conversion unit 54.

Figure 9:
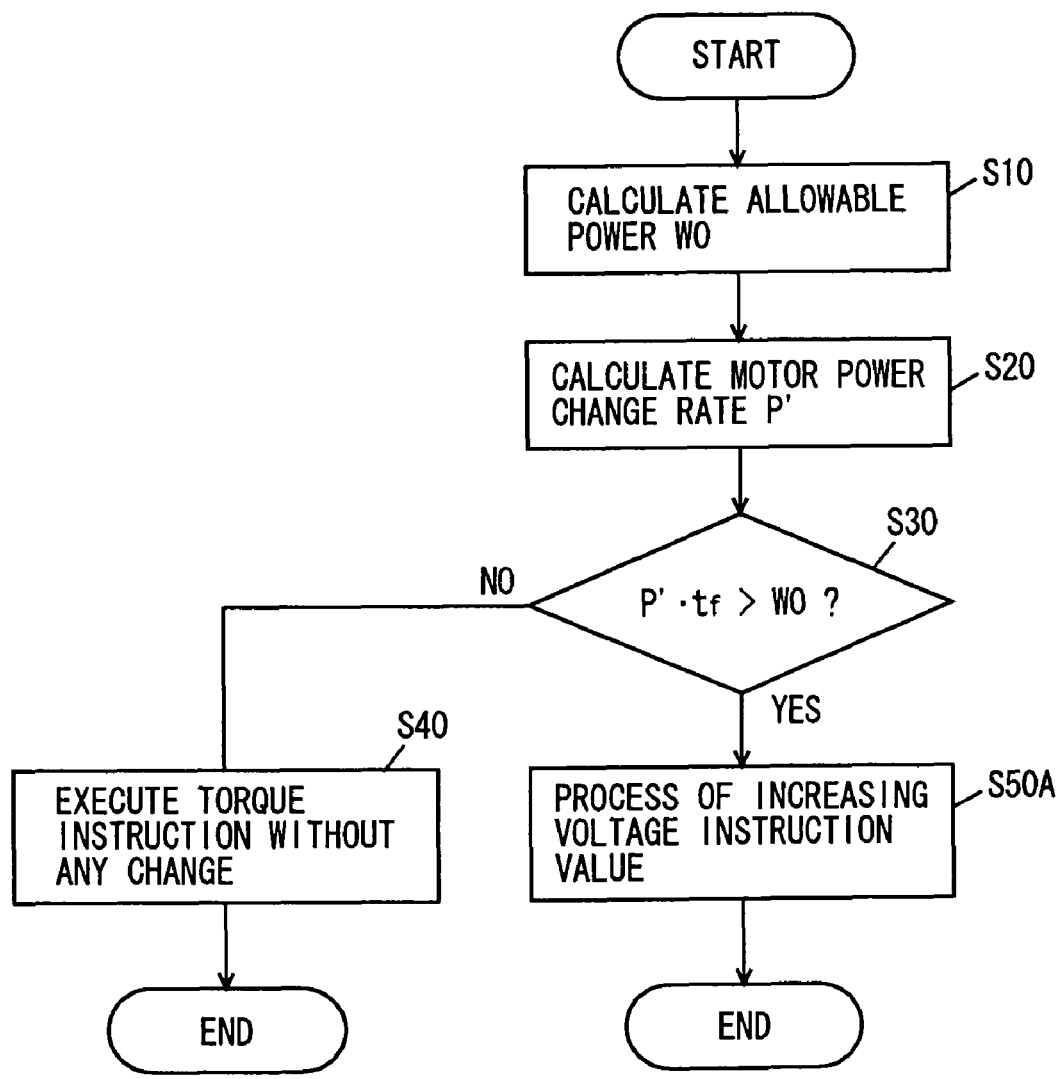
FIG. 9 is a flow chart for describing an operation of controlling an increase amount of consumed power according to the second embodiment.

Referring to FIG. 9, description is made on operations for maintaining the driving operation of electric load apparatus 100A based on the consumed power in inverter 14 and AC motor M1 as electric loads. In the flow chart of FIG. 9, step S50 of the flow chart of FIG. 4 is replaced by step S50A, while rest of the steps are identical to that of flow chart of FIG. 4.

When control unit 32A determines that increase amount Psm of the consumed power exceeds allowable power W0 at step S30, it controls calculation unit 34A such that it calculates voltage instruction Vdccom_up at the current instruction time. Then, calculation unit 34A reads DC voltage Vb and increase amount Psm (=P'·tf) of the consumed power from memory 36, and calculates voltage instruction Vdccom_up by expression (6) using thus read DC voltage Vb and increase amount Psm (=P'·tf) of the consumed power.

Calculation unit 34A outputs thus calculated voltage instruction Vdccom_up to control unit 32A. Control unit 32A in turn outputs voltage instruction Vdccom_up received from calculation unit 34A to feed back voltage instruction calculation unit 52A as the voltage instruction at the current instruction time.

Then, feedback voltage instruction calculation unit 52A calculates feedback voltage instruction Vdccom_fb_up based on voltage instruction Vdccom_up from control unit 32A and output voltage Vm from voltage sensor 20, and outputs thus calculated feedback voltage instruction Vdccom_fb_up to duty ratio conversion unit 54. Duty ratio conversion unit 54 calculates the duty ratio for setting output voltage Vm from voltage sensor 20 to feedback voltage instruction Vdccom_fb_up from feedback voltage instruction calculation unit 52A, based on battery voltage Vb from voltage sensor 10 and feedback voltage instruction Vdccom_fb_up from feedback voltage instruction calculation unit 52A, and generates a signal PWU_up (a type of signal PWU) for turning on/off NPN transistors Q1, Q2 of DC/DC converter 12 based on thus calculated duty ratio. Then, duty ratio conversion unit 54 outputs thus generated signal PWU_up to NPN transistors Q1, Q2 of DC/DC converter 12.

DC/DC converter 12 converts DC voltage Vb to output voltage Vm based on signal PWU_up, such that output voltage Vm attains voltage instruction Vdccom_fb_up, and capacitor 13 stores power (energy) indicated in the left side of expression (6). Thus, the process of increasing voltage instruction value ends (step S50A).

On the other hand, when control unit 32A determines that increase amount Psm of the consumed power does not exceed allowable power W0, it controls calculation unit 34A such that it calculates voltage instruction Vdccom_n, and calculation unit 34A reads torque Tm(n) and motor rotation number MRN from memory 36 to calculate voltage instruction Vdccom_n, and outputs thus calculated voltage instruction Vdccom_n to control unit 32A.

Then, control unit 32A outputs voltage instruction Vdccom_n received from calculation unit 34A to feedback voltage instruction calculation unit 52A as the voltage instruction of the current instruction time. Then, feedback voltage instruction calculation unit 52A calculates feedback voltage instruction Vdccom_fb_n based on voltage instruction Vdccom_n from control unit 32A and output voltage Vm from voltage sensor 20, and outputs thus calculated feedback voltage instruction Vdccom_fb_n to duty ratio conversion unit 54.

Duty ratio conversion unit 54 calculates the duty ratio for setting output voltage Vm from voltage sensor 20 to feedback voltage instruction Vdccom_fb_n from feedback voltage instruction calculation unit 52A based on battery voltage Vb from voltage sensor 10 and feedback voltage instruction Vdccom_fb_n from feedback voltage instruction calculation unit 52A, and generates signal PWU for turning on/off NPN transistors Q1, Q2 of DC/DC converter 12 based on thus calculated duty ratio. Then, duty ratio conversion unit 54 outputs thus generated signal PWU to NPN transistors Q1, Q2 of DC/DC converter 12.

DC/DC converter 12 converts DC voltage Vb to output voltage Vm such that output voltage Vm attains voltage instruction Vdccom_fb_n, based on signal PWU. Thus, the process for executing the torque instruction without any change ends (step S40).

Then, after step S40 or step S50A, the sequence of operations ends.

As above, when increase amount Psm of the consumed power in AC motor M1 exceeds allowable power W0, the voltage instruction that is the target value of output voltage Vm is increased from voltage instruction Vdccom to voltage instruction Vdccom_up, such that the power that can be supplied from capacitor 13 to inverter 14 becomes greater than the increase amount Psm of the consumed power. Specifically, when increase amount Psm of the consumed power exceeds allowable power W0, the power greater than increase amount Psm of the consumed power is stored in capacitor 13.

Thus, even when the consumed power in AC motor M1 increases by Psm, the driving operation of the electric load apparatus 100A can be maintained.

It should be noted that, the controlling of the power being stored capacitor 13 to be greater than increase amount Psm of the consumed power in AC motor M1 corresponds to controlling increase amount Psm of the consumed power in AC motor M1 to be set in a range in which the driving operation of electric load apparatus 100A can be maintained.

Additionally, the electric load controlling method according to the present invention is an electric load controlling method for controlling the increase amount of the consumed power in the electric loads to be set in a range in which the driving operation of the voltage converter (i.e., DC/DC converter 12) can be maintained in accordance with the flow chart of FIG. 9.

Further, the control of the increase amount of the consumed power in control unit 32A, calculation unit 34A, feedback voltage instruction calculation unit 52A and duty ratio conversion unit 54 is practically performed by CPU, where CPU reads a program including each step of the flow chart of the FIG. 9 from ROM, and executes thus read program to control the increase amount of the consumed power in the electric loads to be set in a range in which the driving operation of the electric loads can be maintained in accordance with the flow chart of FIG. 9. Therefore, ROM corresponds to the computer (CPU) readable recording medium recording a program including each step of the flow chart of FIG. 9.

The rest of the feature is identical to that of the first embodiment.

According to the second embodiment, the electric load apparatus includes the DC/DC converter increasing the DC voltage from the DC power source to the output voltage, the inverter driving the AC motor by the output voltage of DC/DC converter, and the control apparatus controlling the DC/DC converter by increasing the voltage instruction value when the increase amount of the consumed power in the inverter and the AC motor as electric loads exceeds the allowable power that can be supplied to the electric loads. Therefore, the driving operation of the electric loads can be continued stably even when the consumed power changes to the extent that may have stopped the driving operation of the electric loads.

Third Embodiment

Figure 10:
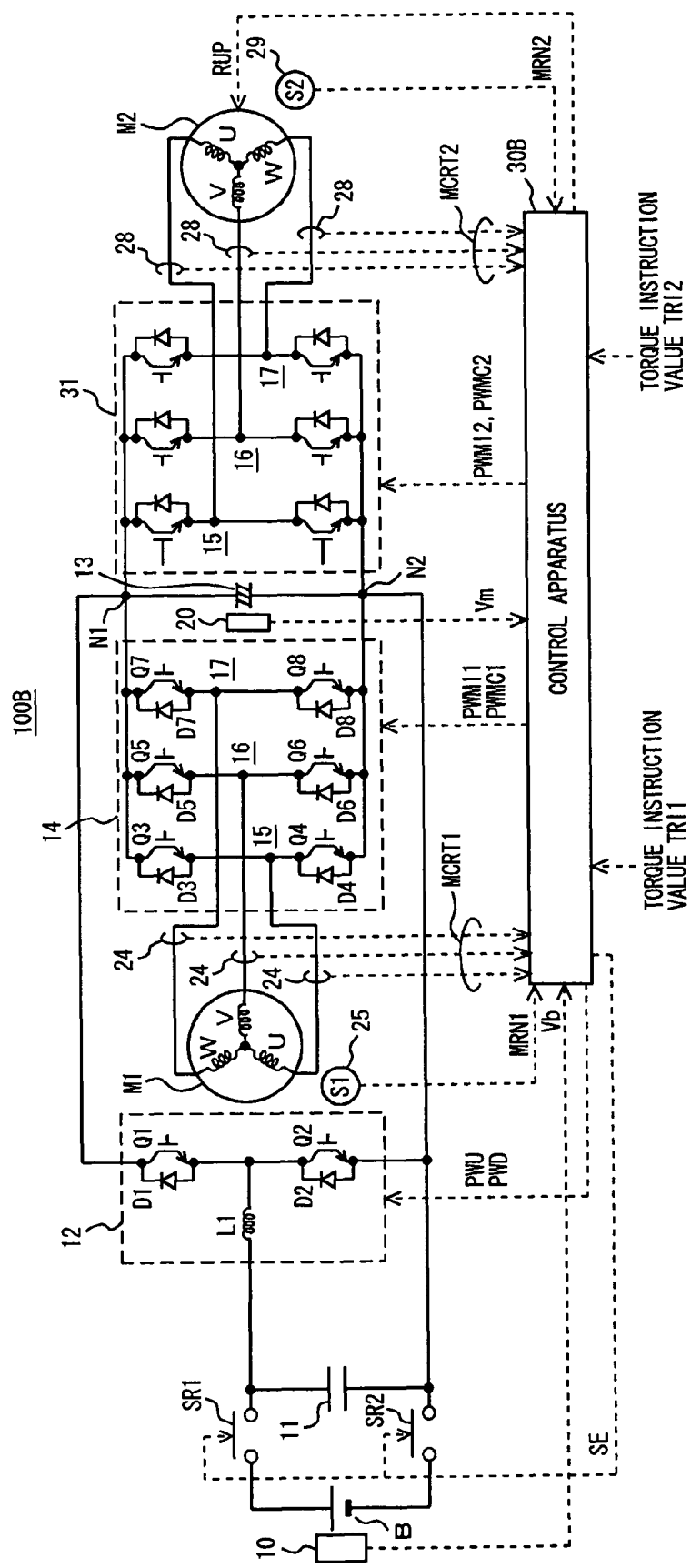
FIG. 10 is a circuit diagram and a block diagram of an electric load apparatus according to the third embodiment.

Referring to FIG. 10, in an electric load apparatus 100B according to the third embodiment, control apparatus 30 of electric load apparatus 100 is replaced by a control apparatus 30B, and a current sensor 28, a rotation sensor 29, an inverter 31 and an AC motor M2 are added. The rest of the configuration is identical to that of electric load apparatus 100.

Capacitor 13 receives output voltage Vm from DC/DC converter 12 via nodes N1, N2, and smoothes thus received output voltage Vm and supplies it to not only inverter 14, but also to inverter 31. Additionally, inverter 14 converts DC voltage from capacitor 13 to AC voltage based on a signal PWMI1 from control apparatus 30B to drive AC motor M1, and converts AC voltage generated by AC motor M1 to DC voltage based on a signal PWMC1.

The configuration of inverter 31 is identical to that of inverter 14. Inverter 31 converts DC voltage from capacitor 13 to AC voltage based on a signal PWMI2 from control apparatus 30B to drive AC motor M2, and converts AC voltage generated by AC motor M2 to DC voltage based on signal PWMC2. Current sensor 28 detects motor current MCRT2 flowing through each phase of AC motor M2, and outputs it to control apparatus 30B.

Current sensor 24 detects motor current MCRT1 and outputs it to control apparatus 30B. Current sensor 28 detects motor current MCRT2 and outputs it to control apparatus 30B. Rotation sensor 25 detects motor rotation number MRN1 and outputs it to control apparatus 30B. Rotation sensor 29 detects motor rotation number MRN2 and outputs it to control apparatus 30B. AC motor M2 increases electricity generation in accordance with a signal RUP from control apparatus 30B.

Control apparatus 30B receives DC voltage Vb output from DC power source B from voltage sensor 10, receives motor currents MCRT1, MCRT2 from current sensors 24, 28, respectively, receives output voltage Vm of DC/DC converter 12 (i.e., input voltage to inverters 14, 31) from voltage sensor 20, receives torque instruction values TRI1, TRI2 from the external ECU, and receives motor rotation numbers MRN1, MRN2 from rotation sensors 25, 29, respectively. Control apparatus 30B generates signal PWMI1 for switching-control of NPN transistors Q3-Q8 of inverter 14 when inverter 14 drives AC motor M1 according to the method described above, based on DC voltage Vb, output voltage Vm, motor current MCRT1, torque instruction value TRI1 and motor rotation number MRN1, and outputs thus generated signal PWMI1 to inverter 14.

Additionally, control apparatus 30B generates signal PWMI2 for switching-control of NPN transistors Q3-Q8 of inverter 31 when inverter 31 drives AC motor M2 according to the method described above, based on DC voltage Vb, output voltage Vm, motor current MCRT2, torque instruction value TRI2 and motor rotation number MRN2, and outputs thus generated signal PWMI2 to inverter 31.

Further, control apparatus 30B generates signal PWU for switching-control of NPN transistors Q1, Q2 of DC/DC converter 12 according to the method described above, when inverter 14 (or 31) drives AC motor M1 (or M2), based on DC voltage Vb, output voltage Vm, motor current MCRT1 (or MCRT2), torque instruction value TRI1 (or TRI2) and motor rotation number MRN1 (or MRN2), and outputs it to DC/DC converter 12.

Further, control apparatus 30B generates signal PWMC1 for converting AC voltage generated by AC motor M1 to DC voltage in the regenerative braking mode, or signal PWMC2 for converting AC voltage generated by AC motor M2 to DC voltage, and outputs thus generated signal PWMC1 or signal PWMC2 to inverter 14 or inverter 31, respectively. In this case, control apparatus 30B generates signal PWD controlling DC/DC converter 12 such that it decreases DC voltage from inverter 14 or 31 to charge DC power source B, and outputs it to DC/DC converter 12.

Still further, control apparatus 30B performs control for maintaining the driving operation of electric load apparatus 100B when the consumed power in AC motor M1 increases. In the following, for the clarity of description, description will be given on the control for maintaining the driving operation of electric load apparatus, 100B when increase amount Psm of the consumed power in AC motor M1 exceeds allowable power W0.

More specifically, control apparatus 30B calculates increase amount Psm of the consumed power in AC motor M1 and allowable power W0 in accordance with the method described above, based on DC voltage Vb from voltage sensor 10, output voltage Vm from voltage sensor 20, motor current MCRT1 from current sensor 24 and motor rotation number MRN1 from rotation sensor 25. Then, when increase amount Psm of the consumed power exceeds allowable power W0, control apparatus 30B controls AC motor M2 and inverter 31 to increase the power that can be supplied from capacitor 13 to inverter 14 in accordance with the method described later. When the increase amount of the consumed power does not exceed the allowable power, control apparatus 30B keeps the control in the same manner.

Still further, control apparatus 30B generates signal SE for turning on/off system relays SR1, SR2 and outputs them to system relays SR1, SR2.

Figure 11:
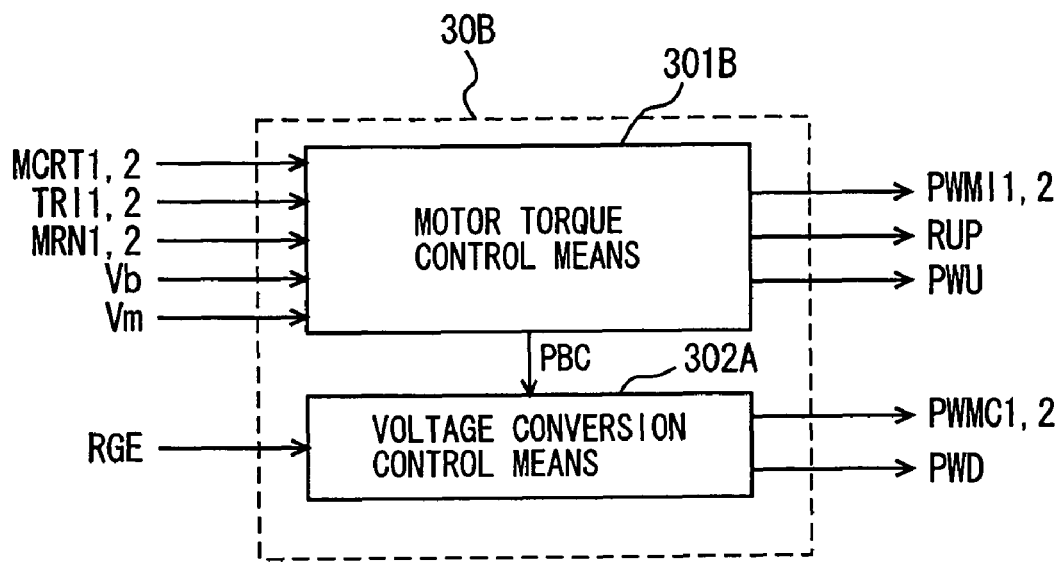
FIG. 11 is a block diagram of a control apparatus shown in FIG. 10.

Referring to FIG. 11, control apparatus 30B includes motor torque control means 301B and voltage conversion control means 302A. Motor torque control means 301B generates signals PWMI1, 2 based on motor currents MCRT1, 2, torque instruction values TRI1, 2, motor rotation numbers MRN1, 2, DC voltage Vb and output voltage Vm, and outputs thus generated signals PWMI1, 2 to inverters 14, 31, respectively.

Additionally, motor torque control means 301B generates signal PWU based on DC voltage Vb, output voltage Vm, motor current MCRT1 (or MCRT2), torque instruction value TRI1 (or TRI2) and motor rotation number MRN1 (or MRN2), and outputs thus generated signal PWU to DC/DC converter 12.

Further, motor torque control means 301B calculates increase amount Psm of the consumed power in AC motor M1 and allowable power W0 in accordance with the method described above. Then, when the consumed power Psm exceeds allowable power W0, motor torque control means 301B generates a signal PWMI2c (a type of signal PWMI2) for decreasing the consumed power in AC motor M2, and outputs it to inverter 31. Additionally, when the consumed power Psm exceeds allowable power W0, motor torque control means 301B generates a signal RUP for increasing electricity generation in AC motor M2 and a signal PBC instructing generation of signal PWMC2, and outputs signal RUP to AC motor M2 and outputs signal PBC to voltage conversion control means 302A. It should be noted that, when the consumed power Psm does not exceed allowable power W0, motor torque control means 301B keeps the control in the same manner.

When voltage conversion control means 302A receives from the external ECU signal RGE indicating that the hybrid vehicle or the electric vehicle equipped with electric load apparatus 100B enters the regenerative braking mode, it generates signals PWMC1, 2 and signal PWD, and outputs thus generated signals PWMC1, 2 to inverters 14, 31, respectively, and outputs signal PWD to DC/DC converter 12.

Additionally, voltage conversion control means 302A generates signal PWMC2 in response to signal PBC from motor torque control means 301B and outputs it to inverter 31.

Figure 12:
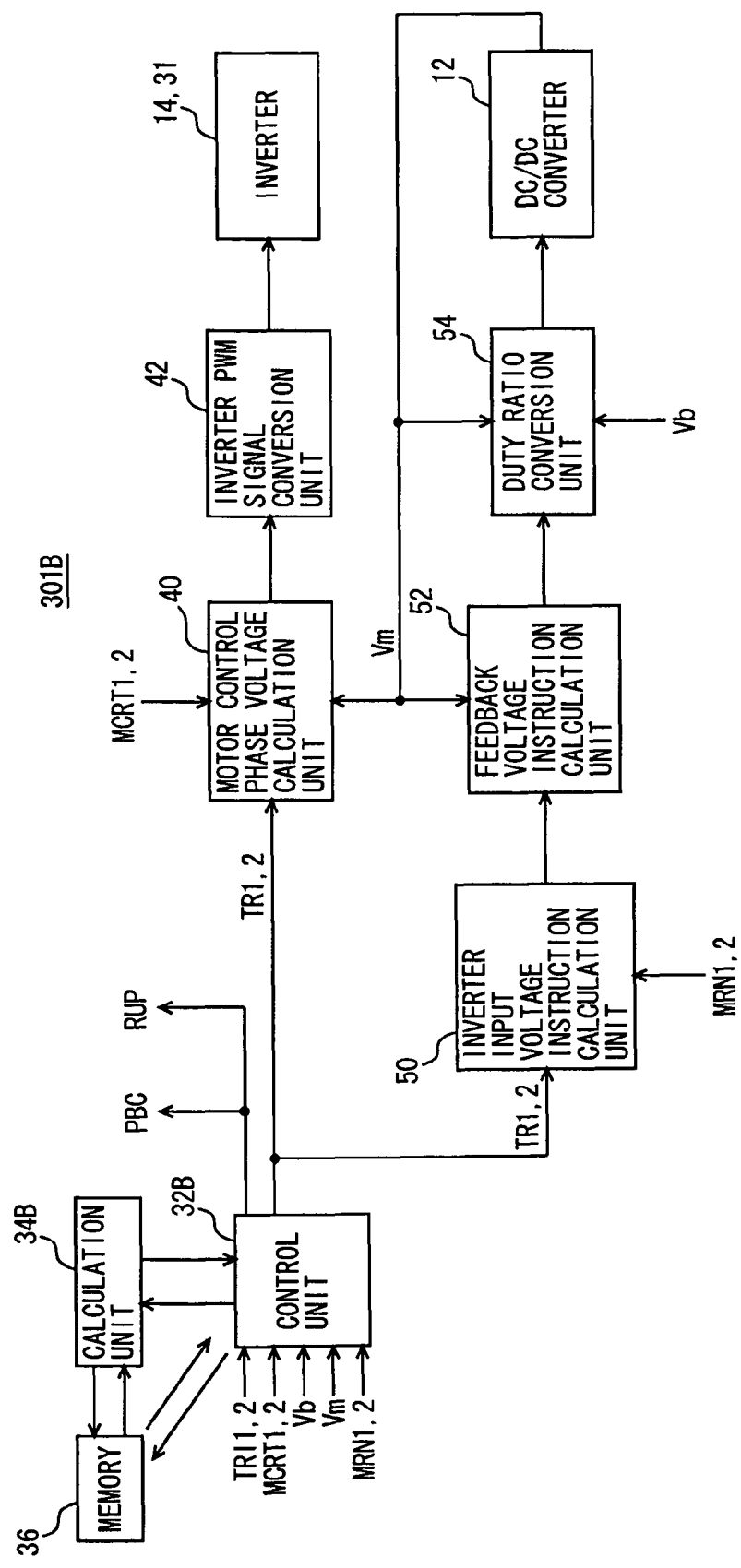
FIG. 12 is a block diagram of a motor torque control means shown in FIG. 11.

Referring to FIG. 12, in motor torque control means 301B, control unit 32 and calculation unit 34 of motor torque control means 301 are replaced by a control unit 32B and a calculation unit 34B, respectively, while the rest of the configuration is identical to that of motor torque control means 301.

Motor torque control means 301B generates signals PWMI1, 2 and signal PWU based on two torque instruction values TRI1, 2, two motor current MCRT1, 2 and two motor rotation numbers MRN1, 2, and controls inverters 14, 31 and DC/DC converter 12 based on the generated signals PWMI1, 2 and signal PWU, respectively.

Control unit 32B receives torque instruction values TRI1, 2 from the external ECU, DC voltage Vb from voltage sensor 10, output voltage Vm from voltage sensor 20, motor rotation number MRN1 from rotation sensor 25 and rotation number MRN2 from rotation sensor 29. Then, control unit 32B outputs torque instruction values TRI1, 2 to motor control phase voltage calculation unit 40 and inverter input voltage instruction calculation unit 50 without any change. Additionally, control unit 32B stores DC voltage Vb, output voltage Vm and motor rotation numbers MRN1, 2 in memory 36.

When control unit 32B determines that increase amount Psm of the consumed power in AC motor M1 exceeds allowable power W0, it determines whether AC motor M2 is in a consumption mode by the polarity of torque Tm2(n) of AC motor M2 calculated based on motor current MCRT2. More specifically, control unit 32B reads torque Tm2(n) from memory 36, and when thus read torque Tm2(n) is positive, control unit 32B determines that AC motor M2 is in the consumption mode, and when torque Tm2(n) is negative, it determines that AC motor M2 is in a electricity generation mode.

When control unit 32B determines that AC motor M2 is in the consumption mode, it outputs torque T'm2(n) that is smaller than torque Tm2(n) to motor control phase voltage calculation unit 40.

When control unit 32B determines that AC motor M2 is in the electricity generation mode, it generates signals RUP and PBC, and outputs thus generated signal RUP to AC motor M2, and outputs thus generated signal PBC to voltage conversion control means 302A.

Calculation unit 34B calculates expressions (1)-(4) according to the first embodiment. In this case, calculation unit 34B calculates expressions (2), (3), torque Tm1(n) and rotation angular speed ωm1(n) using motor current MCRT1 and motor rotation number MRN1 read from memory 36 for each timing.

Additionally, calculation unit 34B calculates torque Tm2(n) based on motor current MCRT2 read from memory 36 for each timing.

Further, calculation unit 34B calculates torque instruction T'm2(n) at the current instruction time based on the control from control unit 32B in accordance with the following expression:

$$T'm2(n) = Tm2(n) - n \cdot \frac{P1}{\omega m1} \quad (7)$$

where n is a constant at least 1. Additionally, ωm1 is the rotation angular speed of AC motor M1 at the current instruction time. Further, P1 is a value greater than increase amount Psm of the consumed power in AC motor M1.

Expression (7) means that torque instruction T'm2(n) at the current instruction time is the torque that is smaller than torque Tm2(n), which should originally be output from AC motor M2, by torque n=P1/ωm1, which is for covering increase amount Psm of the consumed power in AC motor M1.

Motor control phase voltage operation unit 40 calculates the voltage to be applied to each phase of AC motor M1 based on output voltage Vm of DC/DC converter 12, motor current MCRT1, and torque instruction value TR1, and calculates the voltage to be applied to each phase of AC motor M2 based on output voltage Vm, motor current MCRT2, and torque instruction value TR2. Then, motor control phase voltage calculation unit 40 outputs thus calculated voltage for AC motor M1 or M2 to inverter PWM signal conversion unit 42.

When inverter PWM signal conversion unit 42 receives the voltage for AC motor M1 from motor control phase voltage calculation unit 40, it generates a signal PWMI1 based on thus received voltage, and outputs it to inverter 14. Additionally, when inverter PWM signal conversion unit 42 receives the voltage for AC motor M2 from motor control phase voltage calculation unit 40, it generates a signal PWMI2 based on thus received voltage, and outputs it to inverter 31.

Inverter input voltage instruction calculation unit 50 calculates voltage instruction Vdccom based on torque instruction value TR1 and motor rotation number MRN1 (or torque instruction value TR2 and motor rotation number MRN2), and outputs thus calculated voltage instruction Vdccom to feedback voltage instruction calculation unit 52.

The rest of the operation of motor torque control means 301B is identical to that of motor torque control means 301.

Figure 13:
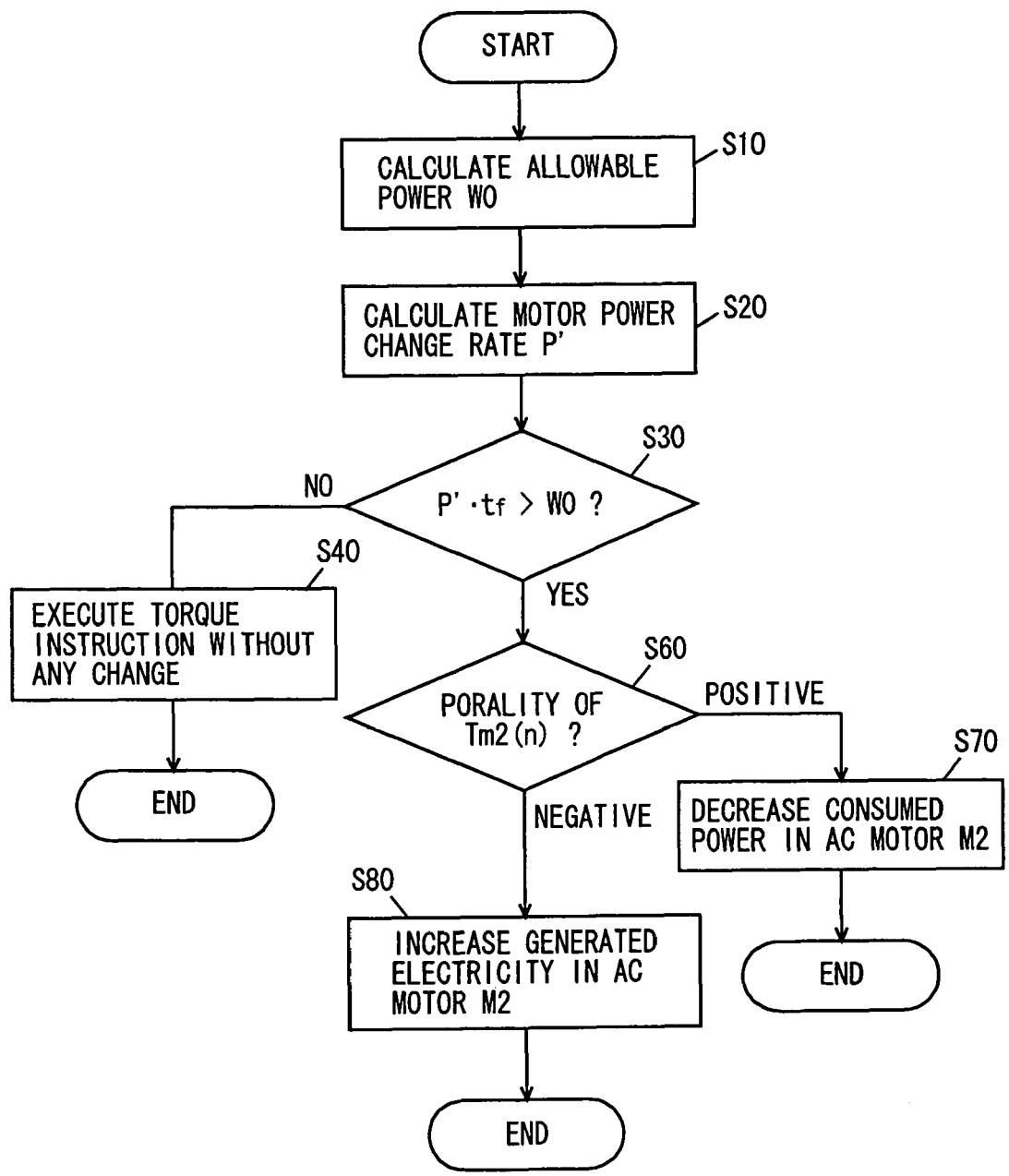
FIG. 13 is a flow chart for describing an operation of controlling an increase amount of consumed power according to the third embodiment.

Referring to FIG. 13, description is made on operations for maintaining the driving operation of electric load apparatus 100B based on the consumed power in inverter 14 and AC motor M1 as electric loads. In the flow chart of FIG. 13, step S50 shown in the flow chart of FIG. 4 is eliminated, and steps S60, S70, S80 are added. The rest of the steps are identical to that of the flow chart of FIG. 4.

At step S30, when control unit 32B determines that increase amount Psm of the consumed power in AC motor M1 exceeds allowable power W0, it reads torque Tm2(n) from memory 36 to determine whether the polarity of thus read torque Tm2(n) is positive or negative (step S60).

At step S60, when the polarity of torque Tm2(n) is determined to be positive, control unit 32B determines that AC motor M2 is in the consumption mode, and it controls the calculation unit 34B such that it calculates torque instruction T'm2(n). The calculation unit 34B calculates torque instruction T'm2(n) through expression (7) based on the control from control unit 32B, and outputs it to control unit 32B.

Then, control unit 32B outputs torque instruction T'm2(n) from calculation unit 34B to motor control phase voltage calculation unit 40 as torque instruction value TR2. Motor control phase voltage calculation unit 40 calculates the voltage to be applied to each phase of AC motor M2, based on output voltage Vm, motor current MCRT2, and torque instruction value TR2 (=T'm2(n)). Then, motor control phase voltage calculation unit 40 outputs thus calculated voltage for AC motor M2 to inverter PWM signal conversion unit 42.

When inverter PWM signal conversion unit 42 receives the voltage for AC motor M2 from motor control phase voltage calculation unit 40, it generates signal PWMI2c based on thus received voltage and outputs it to inverter 31. Inverter 31 drives AC motor M2 based on signal PWMI2c. Thus, the consumed power in AC motor M2 is reduced (step S70). Then, in AC motor M2, the consumed power is reduced that corresponds to the power for covering the increase amount of the consumed power in AC motor M1.

On the other hand, at step S60, if the polarity of torque Tm2(n) is determined to be negative, control unit 32B determines that AC motor M2 is in the electricity generating mode, and generates signals RUP and PBC, and outputs them to AC motor M2 and voltage conversion control means 302A, respectively.

Then, voltage conversion controlling means 302A generates signal PWMC2 in accordance with signal PBC, and outputs it to inverter 31. Additionally, AC motor M2 increases electricity generation in accordance with signal RUP (step S80). Inverter 31 converts AC voltage from AC motor M2 to DC voltage in accordance with signal PWMC2, and supplies thus converted DC voltage to capacitor 13 via nodes N1 and N2.

Thus, the power that can be supplied from capacitor 13 to inverter 14 is increased.

Additionally, at step S30, when increase amount Psm of the consumed power in AC motor M1 is determined to be smaller than the allowable power, the control is kept in the same manner (step S40).

After step S40 or step S70 or step S80, the sequence of operations ends.

As above, according to the third embodiment, when consumed power in AC motor M1 abruptly increases, inverter 31 or inverter 31 and AC motor M2 is/are controlled to reduce the consumed power in AC motor M2 or to increase the electricity generation in AC motor M2.

Referring again to FIG. 10, the overall operation of electric load apparatus 100B is described. When the overall operation is started, control apparatus 30B generates signal SE of H level and outputs it to system relays SR1, SR2, through which system relays SR1 and SR2 are turned on. DC power source B outputs DC voltage to DC/DC converter 12 via system relays SR1, SR2.

Voltage sensor 10 detects DC voltage Vb output from DC power source B, and outputs thus detected DC voltage Vb to control apparatus 30B. Voltage sensor 20 detects voltage Vm between both ends of capacitor 13, and outputs thus detected voltage Vm to control apparatus 30B. Further, current sensor 24 detects motor current MCRT1 flowing through AC motor M1 and outputs it to control apparatus 30B, while current sensor 28 detects motor current MCRT2 flowing through AC motor M2 and outputs it to control apparatus 30B. Still further, rotation sensor 25 detects motor rotation number MRN1 of AC motor M1 and outputs it to control apparatus 30B, while rotation sensor 29 detects motor rotation number MRN2 of AC motor M2 and outputs it to control apparatus 30B. Then, control apparatus 30B receives torque instruction values TR1, 2 from the external ECU.

Then, control apparatus 30B generates signal PWMI1 in accordance with the method described above, based on DC voltage Vb, output voltage Vm, motor current MCRT1, torque instruction value TRI1 and motor rotation number MRN1, and outputs thus generated signal PWMI1 to inverter 14. Further, control apparatus 30B generates signal PWMI2 in accordance with the method described above, based on DC voltage Vb, output voltage Vm, motor current MCRT2, torque instruction value TRI2 and motor rotation number MRN2, and outputs thus generated signal PWMI2 to inverter 31.

Still further, when inverter 14 (or 31) drives AC motor M1 (or M2), control apparatus 30B generates signal PWU for switching-control of NPN transistors Q1, Q2 of DC/DC converter 12 in accordance with the method described above, based on DC voltage Vb, output voltage Vm, motor current MCRT1 (or MCRT2), torque instruction value TRI1 (or TRI2) and motor rotation number MRN1 (or MRN2), and outputs thus generated signal PWU to DC/DC converter 12.

Then, in accordance with signal PWU, DC/DC converter 12 increases DC voltage Vb from DC power source B, and supplies thus increased DC voltage to capacitor 13 via nodes N1, N2. Inverter 14 converts DC voltage smoothed by capacitor 13 to AC voltage by signal PWMI1 from control apparatus 30B to drive AC motor M1. Additionally, inverter 31 converts DC voltage smoothed by capacitor 13 to AC voltage by signal PWMI2 from control apparatus 30B to drive AC motor M2. Thus, AC motor M1 produces the torque specified by torque instruction value TRI1, while AC motor M2 produces the torque specified by torque instruction value TRI2.

In the regenerative braking mode of the hybrid vehicle or the electric vehicle equipped with electric load apparatus 100B, control apparatus 30B receives signal RGE from external ECU, and generates signals PWMC1, 2 in accordance with the received signal RGE and outputs them to inverters 14, 31, respectively, and generates signal PWD and outputs it to DC/DC converter 12.

Then, inverter 14 converts AC voltage generated by AC motor M1 to DC voltage in accordance with signal PWMC1, and supplies thus converted DC voltage to DC/DC converter 12 via capacitor 13. Additionally, inverter 31 converts AC voltage generated by AC motor M2 to DC voltage in accordance with signal PWMC2, and supplies thus converted DC voltage to DC/DC converter 12 via capacitor 13. DC/DC converter 12 receives DC voltage from capacitor 13 via nodes N1, N2, and decreases thus received DC voltage by signal PWD, and supplies thus reduced DC voltage to DC power source B. Thus, the electricity generated by AC motor M1 or M2 is charged to DC power source B.

When the consumed power in AC motor M1 abruptly increases while AC motors M1, M2 are driving, control apparatus 30B calculates increase amount Psm of the consumed power in AC motor M1 in accordance with the method described above, and determines whether thus calculated increase amount Psm of the consumed power exceeds allowable power W0. Then, when increase amount Psm of the consumed power does not exceed allowable power W0, control apparatus 30B keeps the control in the same manner.

On the other hand, when increase amount Psm of the consumed power exceeds allowable power W0, control apparatus 30B determines whether AC motor M2 is in the consumption mode or in the electricity generation mode as described above. When AC motor M2 is in the consumption mode, control apparatus 30B controls inverter 31 to reduce the consumed power in AC motor M2, and when AC motor M2 is in the electricity generation mode, it controls inverter 31 and AC motor M2 to increase the electricity generation in AC motor M2.

Thus, even when the consumed power in AC motor M1 abruptly increases, the power that can be supplied from capacitor 13 to inverter 14 is increased and electric load apparatus 100B is driven continuously.

The foregoing description is on the case where the consumed power in AC motor M1 abruptly increases. It is needless to say that when the consumed power in AC motor M2 abruptly increases, inverter 14 or inverter 14 and AC motor M1 may be controlled to reduce the consumed power in AC motor M1, or to increase the electricity generation in AC motor M1.

Reducing the consumed power in AC motor M2 corresponds to increasing the power that can be supplied from capacitor 13 to inverter 14 to cover increase amount Psm of the consumed power in AC motor M1. Increasing the power that can be supplied from capacitor 13 to inverter 14 to cover increase amount Psm of the consumed power in AC motor M1 corresponds to controlling increase amount Psm of the consumed power in AC motor M1 to be set in a range in which the driving operation of electric load apparatus 100B can be maintained.

Further, inverters 14, 31 and AC motors M1, M2 form "electric loads".

Still further, one of AC motors M1, M2 forms "a generator". When electric load apparatus 100B is mounted on the hybrid vehicle, one of AC motors M1, M2 forming the generator is connected to the engine, and generates electricity by the power of the engine.

Still further, the electric load controlling method according to the present invention is an electric load controlling method for controlling the increase amount of the consumed power in the electric loads to be set in a range in which the driving operation of the voltage converter (i.e., DC/DC converter 12) can be maintained in accordance with the flow chart of FIG. 13.

Still further, the control of the increase amount of the consumed power in control unit 32B, calculation unit 34B, motor control phase voltage calculation unit 40 and inverter PWM signal conversion unit 42 is practically performed by CPU, which reads a program including each step of flow chart of FIG. 13 from ROM, and executes thus read program to control the increase amount of the consumed power in the electric loads to be set in a range in which the driving operation of the electric loads can be maintained in accordance with the flow chart of FIG. 13. Accordingly, ROM corresponds to the computer (CPU) readable recording medium recording a program including each step of the flow chart of FIG. 13.

The rest of the feature is identical to that of the first embodiment.

According to the third embodiment, the electric load apparatus includes the DC/DC converter increasing the DC voltage from the DC power source to the output voltage, and the inverter driving the AC motor by the output voltage of the DC/DC converter, and the control apparatus controlling, when the increase amount of the consumed power in one of AC motors exceeds the allowable power that can be supplied to the one of the AC motors, the other AC motor to reduce the consumed power therein or to increase the electricity generation therein. Therefore, the driving operation of the electric loads can be continued stably even when the consumed power changes to the extent that may have stopped the driving operation of the electric loads.

Fourth Embodiment

Figure 14:
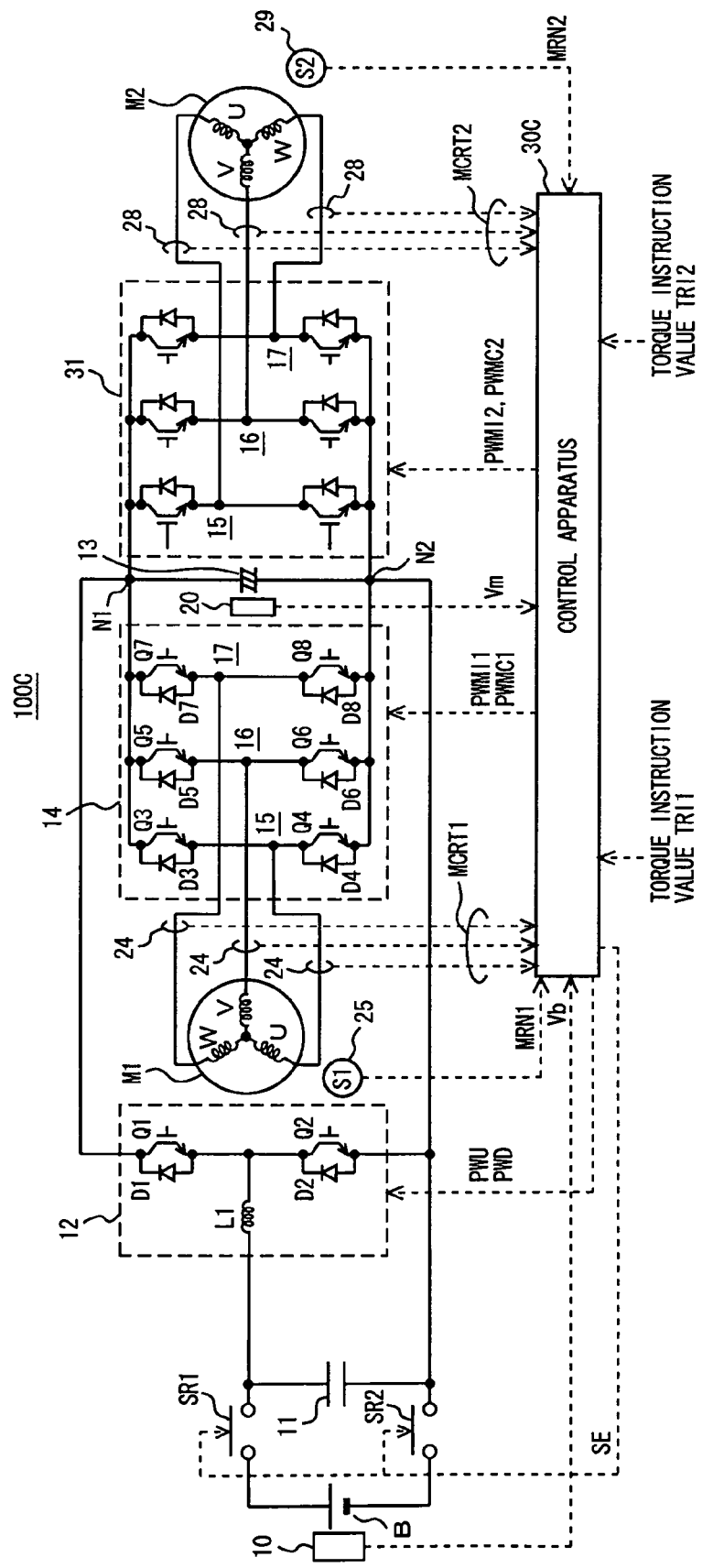
FIG. 14 is a circuit diagram and a block diagram of an electric load apparatus according to the fourth embodiment.

Referring to FIG. 14, in an electric load apparatus 100C according to the fourth embodiment, control apparatus 30B of electric load apparatus 100B is replaced by a control apparatus 30C. The rest of the configuration is identical to that of electric load apparatus 100B.

Control apparatus 30C controls DC/DC converter 12 to maintain the driving operation of electric load apparatus 100C without stopping the operation of DC/DC converter 12, when the regenerative power regenerated from capacitor 13 to DC/DC converter 12 abruptly increases during the operation of AC motors M1, M2. The rest of the operation of control apparatus 30C is identical to that of control apparatus 30B.

If locking of wheels is detected when AC motor M1 is in the consumption mode and AC motor M2 is in the electricity generation mode (specifically, when the hybrid vehicle or the electric vehicle equipped with electric load apparatus 100C is in the regenerative braking control), the consumed power in AC motor M1 abruptly decreases.

Then, the regenerative power regenerated from capacitor 13 to DC/DC converter 12 abruptly increases, and overvoltage is applied to DC/DC converter 12. If the overvoltage is continuously applied to DC/DC converter 12, it may damage DC/DC converter 12.

Then, control apparatus 30C controls DC/DC converter 12 to maintain the driving operation of electric load apparatus 100C even when the regenerative power abruptly increases.

In the following, for the clarity of description, description is made on the case where AC motor M1 is in the consumption mode, while AC motor M2 is in the electricity generation mode.

Figure 15:
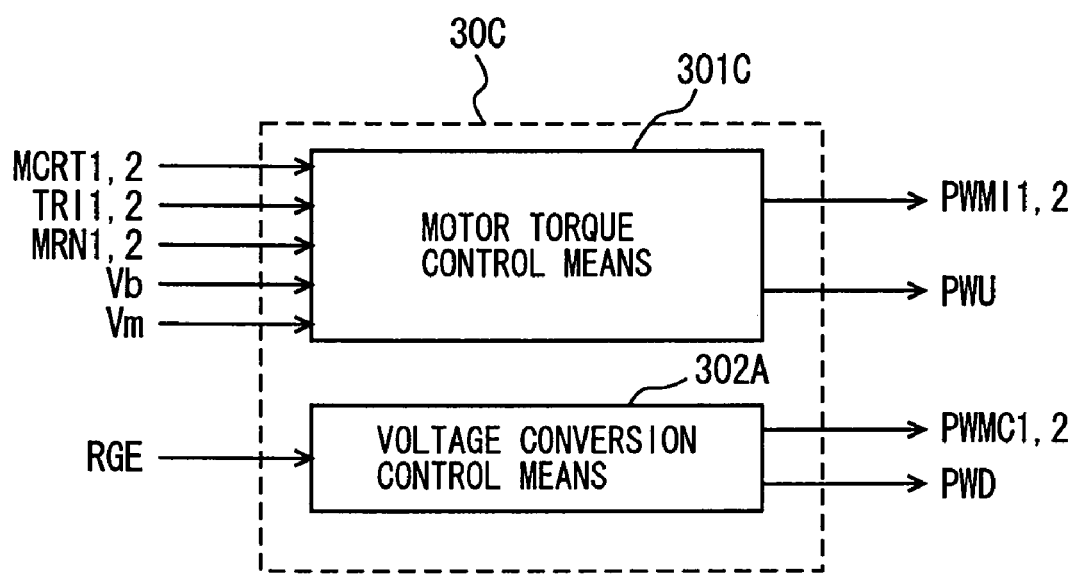
FIG. 15 is a block diagram of a control apparatus shown in FIG. 14.

Referring to FIG. 15, in control apparatus 30C, motor torque controls means 301B of control apparatus 30B is replaced by motor torque control means 301C. The rest of the configuration is identical to that of control apparatus 30B.

Motor torque control means 301C calculates consumed power Pout in AC motor M1 and generated electricity power Pin in AC motor M2 for each instruction time t, and calculates regenerative power Pb based on thus calculated consumed power Pout and generated electricity power Pin. Then, motor torque control means 301C calculates increase amount $\Delta Pb$ of regenerative power Pb from the previous instruction time to the current instruction time, and determines whether increase amount $\Delta Pb$ thus calculated exceeds response maximum value $\Delta Pblim$. As used herein, the response maximum value refers to the increase amount of regenerative power Pb that can be absorbed by DC/DC converter 12.

When increase amount $\Delta Pb$ exceeds response maximum value $\Delta Pblim$, motor torque control means 301C reduces the voltage instruction value to control DC/DC converter 12, and when increase amount $\Delta Pb$ does not exceed response maximum value $\Delta Pblim$, it keeps the control of DC/DC converter 12 in the same manner.

The rest of the operation of motor torque control means 301C is identical to that of motor torque control means 301B.

Figure 16:
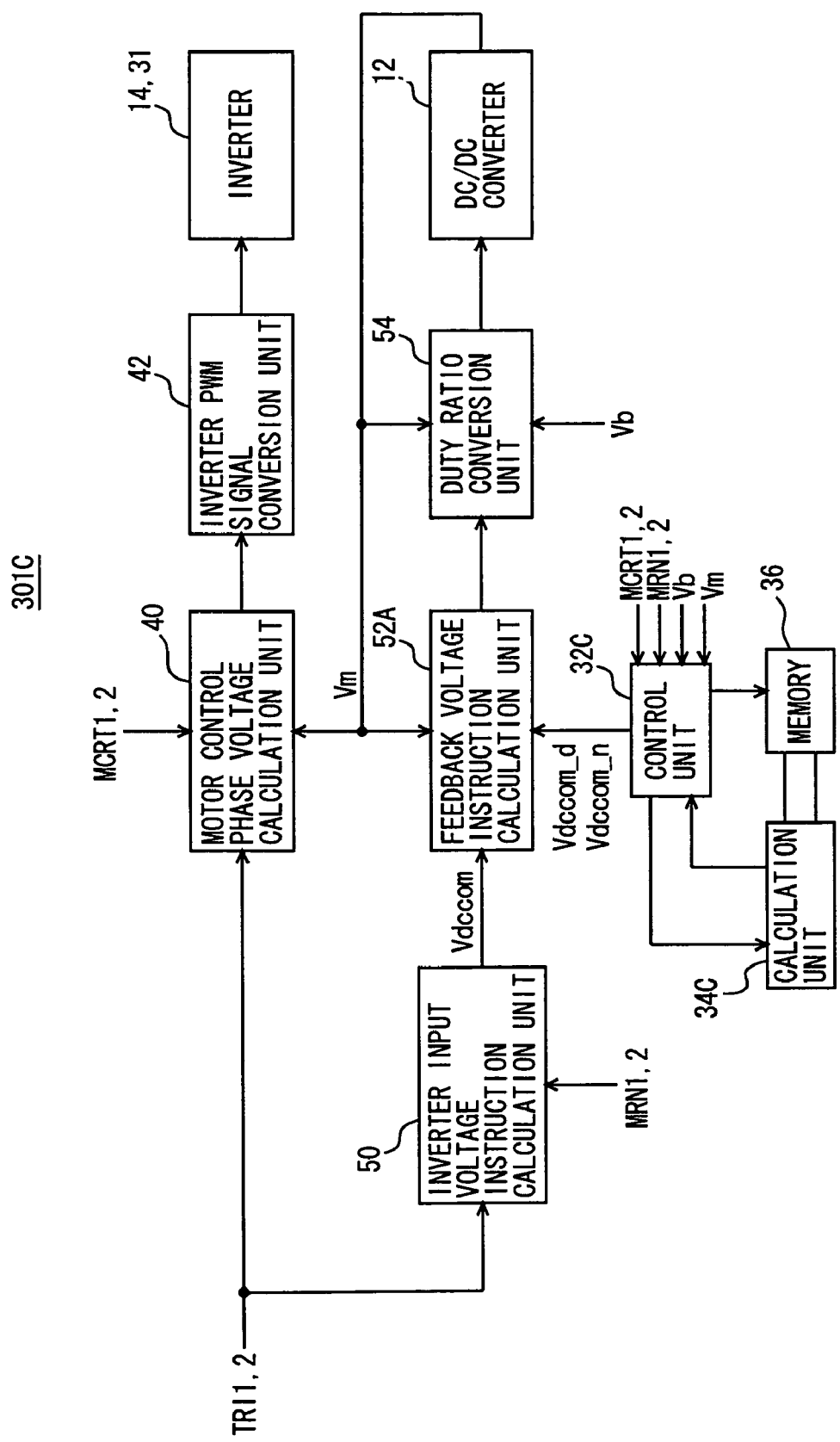
FIG. 16 is a block diagram of a motor torque control means shown in FIG. 15.

Referring to FIG. 16, in motor torque control means 301C, control unit 32B and calculation unit 34B of motor torque control means 301B are replaced by a control unit 32C and a calculation unit 34C, respectively, while the rest of the configuration is identical to that of motor torque control means 301B.

Control unit 32C calculates consumed power Pout and generated electricity power Pin, and controls calculation unit 34C such that it calculates regenerative power Pb based on thus calculated consumed power Pout and generated electricity power Pin. Control unit 32C further controls calculation unit 34C such that it calculates increase amount $\Delta Pb$ of regenerative power Pb.

Control unit 32C determines whether increase amount $\Delta Pb$ of regenerative power Pb calculated by calculation unit 34C exceeds response maximum value $\Delta Pblim$, and when increase amount $\Delta Pb$ exceeds response maximum value $\Delta Pblim$, it controls calculation unit 34C such that it calculates voltage instruction Vdccom_d. Further, when increase amount $\Delta Pb$ does not exceed response maximum value $\Delta Pblim$, it controls calculation unit 34C such that it calculates voltage instruction Vdccom_n.

Control unit 32C outputs voltage instruction Vdccom_d or Vdccom_n calculated by calculation unit 34C to feedback voltage instruction calculation unit 52A.

Calculation unit 34C reads motor current MCRT1 and motor rotation number MRN1 from memory 36, and calculates torque Tm1(n) and rotation angular speed $\omega m1(n)$. Then, calculation unit 34C calculates consumed power Pout in AC motor M1 from thus calculated torque Tm1(n) and rotation angular speed $\omega m1(n)$.

Further, calculation unit 34C reads motor current MCRT2 and output voltage Vm from memory 36, and calculates generated electricity power Pin in AC motor M2 based on thus read motor current MCRT2 and output voltage Vm. Then, calculation unit 34C subtracts consumed power Pout from generated electricity power Pin to obtain regenerative power Pbm(n) at the current instruction time, and further calculates increase amount $\Delta Pb$ of the regenerative power (=Pbm(n)−Pbm(n−1)). In this case, calculation unit 34C reads regenerative power Pbm (n−1) at the previous instruction time from memory 36.

Further, if increase amount $\Delta Pb$ of the regenerative power exceeds response maximum value $\Delta Pblim$, calculation unit 34C calculates increase amount $\Delta Pb0$ of the regenerative power that cannot be absorbed by DC/DC converter 12 in accordance with the following expression:

$$\Delta Pb0 = \Delta Pb - \Delta Pblim \quad (8)$$

Further, calculation unit 34C calculates voltage instruction value $\Delta Vref$ to be reduced based on increase amount $\Delta Pb0$ obtained by expression (8) in accordance with the following expression:

$$\Delta Vref = \sqrt{2 \cdot \Delta Pb0 \cdot T0/C} \quad (9)$$

where T0 is the time from the previous instruction time until the current instruction time.

Further, calculation unit 34C calculates voltage instruction Vdccom_d (n) using voltage instruction value ΔVref to be reduced obtained by expression (9) in accordance with the following expression:

$$Vdccom\_d(n)=Vdccom\_d(n-1)-\Delta Vref \qquad (10)$$

In expression (10), Vdccom_d (n−1) is the voltage instruction at the previous instruction time, which is stored in memory 36. Then, if increase amount ΔPb of the regenerative power exceeds response maximum value ΔPblim at the previous instruction time, Vdccom_d (n−1) is the voltage instruction at the previous instruction time calculated by expressions (8)-(10).

When increase amount ΔPb of the regenerative power does not exceed response maximum value ΔPblim at the previous instruction time, Vdccom_d (n−1) is the voltage instruction Vdccom_n calculated based on torque Tm1(n−1) and motor rotation number MRN1 at the previous instruction time. Specifically, Vdccom_d (n−1) is the voltage instruction for producing torque Tm1(n−1) in AC motor M1.

When increase amount ΔPb of the regenerative power does not exceed response maximum value ΔPblim, calculation unit 34C calculates voltage instruction Vdccom_n (n) based on torque Tm1(n) and motor rotation number MRN1 at the current instruction time.

Control unit 32C outputs voltage instructions Vdccom_d (n), Vdccom_n (n) calculated by calculation unit 34C to feedback voltage instruction calculation unit 52A as voltage instructions Vdccom_d, Vdccom_n, respectively.

Figure 17:
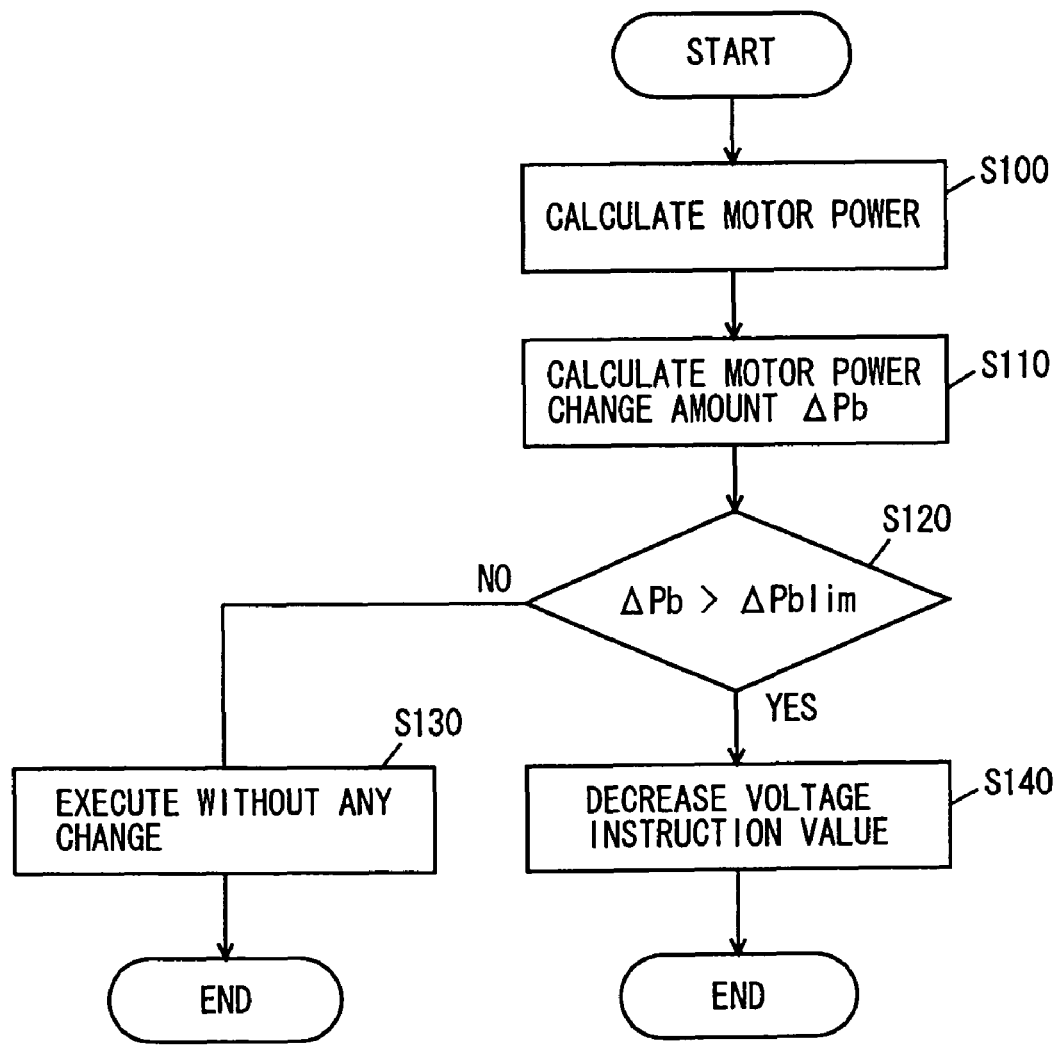
FIG. 17 is a flow chart for describing an operation of controlling an increase amount of consumed power according to the fourth embodiment.

Referring to FIG. 17, description is made on the operations for maintaining the driving operation of electric load apparatus 100C based on the consumed power in inverter 14 and AC motor M1 as electric loads.

When a sequence of operations is started, calculation unit 34C calculates consumed power Pout in AC motor M1 and generated electricity power Pin in AC motor M2 (step S100). Then, calculation unit 34C subtracts consumed power Pout from thus calculated generated electricity power Pin to obtain regenerative power Pb, and further calculates increase amount ΔPb of thus calculated regenerative power Pb from the previous instruction time until the current instruction time (step S110).

Then, control unit 32C determines whether increase amount ΔPb of the regenerative power calculated by calculation unit 34C exceeds response maximum value ΔPblim (step S120). When control unit 32C determines that increase amount ΔPb of the regenerative power is at most as large as response maximum value ΔPblim at step S120, it controls calculation unit 34C such that it calculates voltage instruction Vdccom_n.

Then, calculation unit 34C reads torque Tm1(n) and motor rotation number MRN1 at the current instruction time from memory 36 based on the control from control unit 32C to calculate voltage instruction Vdccom_n. Control unit 32C outputs voltage instruction Vdccom_n calculated by calculation unit 34C to feedback voltage instruction calculation unit 52A.

Feedback voltage instruction calculation unit 52A calculates feedback voltage instruction Vdccom_fb_n based on voltage instruction Vdccom_n from control unit 32C and output voltage Vm from voltage sensor 20, and outputs it to duty ratio conversion unit 54. Duty ratio conversion unit 54 calculates the duty ratio for setting output voltage Vm from voltage sensor 20 to feedback voltage instruction Vdccom_fb_n from feedback voltage instruction calculation unit 52A based on battery voltage Vb from voltage sensor 10 and feedback voltage instruction Vdccom_fb_n from feedback voltage instruction calculation unit 52A, and generates signal PWU for turning on/off NPN transistors Q1, Q2 of DC/DC converter 12 based on thus calculated duty ratio. Then, duty ratio conversion unit 54 outputs thus generated signal PWU to NPN transistors Q1, Q2 of DC/DC converter 12.

DC/DC converter 12 converts DC voltage Vb to output voltage Vm such that output voltage Vm attains voltage instruction Vdccom_fb_n, based on signal PWU. Thus the process for executing torque instruction without any change ends (step S130).

On the other hand, when control unit 32C determines that increase amount ΔPb of the regenerative power exceeds response maximum value ΔPblim at step S120, it controls calculation unit 34C such that it calculates voltage instruction Vdccom_d.

Then, calculation unit 34C calculates increase amount ΔPb0 of the regenerative power that cannot be absorbed by DC/DC converter 12 by expression (8) based on the control from control unit 32C. Then, calculation unit 34C calculates the reduction amount ΔVref of voltage instruction value by substituting time T0 from previous instruction time until current instruction time and thus calculated increase amount ΔPb0 into expression (9). Further, calculation unit 34C reads voltage instruction Vdccom_d (n−1) at the previous instruction time from memory 36, and substitutes thus read voltage instruction Vdccom_d (n−1) and thus calculated reduction amount ΔVref into expression (10), to obtain voltage instruction Vdccom_d (n) at the current instruction time.

Control unit 32C outputs voltage instruction Vdccom_d (n) from calculation unit 34C to feedback voltage instruction calculation unit 52A as voltage instruction Vdccom_d. Feedback voltage instruction calculation unit 52A calculates feedback voltage instruction Vdccom_fb_d based on voltage instruction Vdccom_d from control unit 32C and output voltage Vm from voltage sensor 20, and outputs it to duty ratio conversion unit 54. Duty ratio conversion unit 54 calculates the duty ratio for setting output voltage Vm from voltage sensor 20 to feedback voltage instruction Vdccom_fb_d from feedback voltage instruction calculation unit 52A based on battery voltage Vb from voltage sensor 10 and feedback voltage instruction Vdccom_fb_d from feedback voltage instruction calculation unit 52A, and generates a signal PWUD (a type of signal PWU) for turning on/off NPN transistors Q1, Q2 of DC/DC converter 12 based on thus calculated duty ratio. Then, duty ratio conversion unit 54 outputs thus generated signal PWUD to NPN transistors Q1, Q2 of DC/DC converter 12.

DC/DC converter 12 converts DC voltage Vb to output voltage Vm such that output voltage Vm attains voltage instruction Vdccom_fb_d, based on signal PWUD. More specifically, DC/DC converter 12 converts DC voltage Vb to output voltage Vm by increasing the time in which NPN transistor Q1 is turned on. Thus, the control of DC/DC converter 12 reducing voltage instruction value is performed (step S130). Then, the voltage level of output voltage Vm decreases, and the overvoltage will not be applied to DC/DC converter 12.

By increasing the time in which NPN transistor Q1 is turned on, the voltage level of output voltage Vm decreases. Therefore, controlling DC/DC converter 12 by reducing voltage instruction value corresponds to controlling DC/DC converter 12 by increasing the time in which NPN transistor Q1 is turned on.

In the foregoing, while description has been made on the case where AC motor M1 is in the consumption mode, and AC motor M2 is in the electricity generation mode, the present invention is not limited thereto, and, needless to say, it is applicable to the case where AC motor M1 is in the electricity generation mode and AC motor M2 is in the consumption mode.

Further, in the foregoing, while description has been given on the case where two motors are employed. However, since it is assumed that the regenerative power abruptly increases in the regenerative mode even with one motor, the present invention also includes the case where DC/DC converter 12 is controlled by reducing the voltage instruction value for preventing the overvoltage from being applied to the output side of DC/DC converter 12 when there is one motor.

Still further, response maximum value ΔPblim corresponds to "the limit value" that is the maximum value of change amount of power in the electric loads at which the driving operation of the electric loads (inverter 14, 31 and AC motors M1, M2) can be maintained.

Still further, the electric load controlling method according to the present invention is an electric load controlling method for controlling the increase amount of the consumed power in the electric loads to be set in a range in which the driving operation of the voltage converter (i.e., DC/DC converter 12) can be maintained in accordance with the flow chart of FIG. 17.

Still further, the control of the increase amount of the regenerative power in control unit 32C, calculation unit 34C, feedback voltage instruction calculation unit 52A and duty ratio conversion unit 54 is practically performed by CPU, which reads a program including each step of the flow chart of FIG. 17 from ROM, and executes thus read program to control the increase amount of the regenerative power in the electric loads to be set in a range in which the driving operation of the electric loads can be maintained in accordance with the flow chart of FIG. 17. Accordingly, ROM corresponds to the computer (CPU) readable recording medium recording a program including each step of the flow chart of FIG. 17.

The rest of the feature is identical to that of the third embodiment.

According to the fourth embodiment, the electric load apparatus includes the DC/DC converter increasing the DC voltage from the DC power source to the output voltage, and the inverter driving the AC motor by the output voltage of the DC/DC converter, and the control apparatus controlling the DC/DC converter by reducing the voltage instruction value, when the increase amount of the regenerative power from the AC motor to the DC/DC converter exceeds the response maximum value that can be absorbed by the DC/DC converter. Therefore, the overvoltage will not be applied to the DC/DC converter and the driving operation of the electric loads can be continued stably even when the regenerative power increases to the extent that may have stopped the driving operation of the electric loads.

Fifth Embodiment

Figure 18:
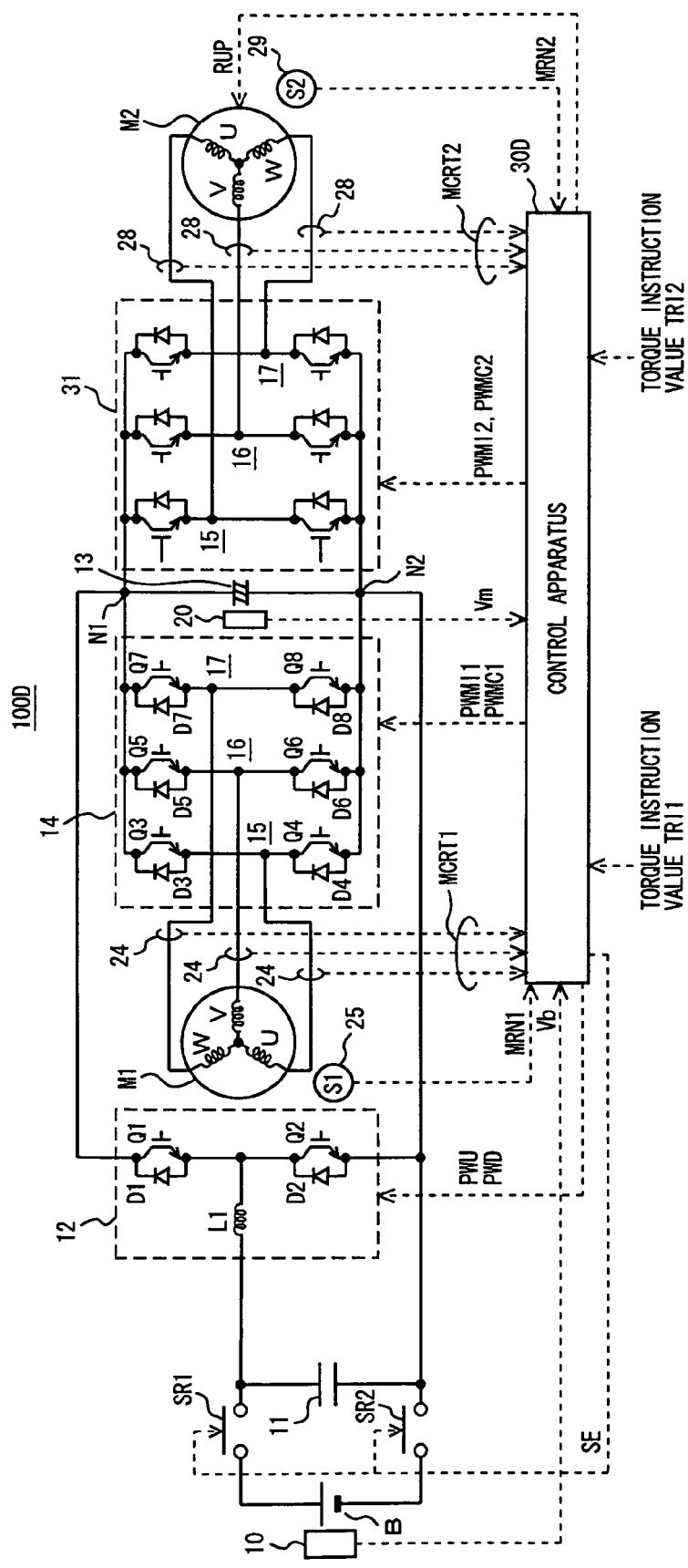
FIG. 18 is a circuit diagram and a block diagram of an electric load apparatus according to the fifth embodiment.
Figure 19:
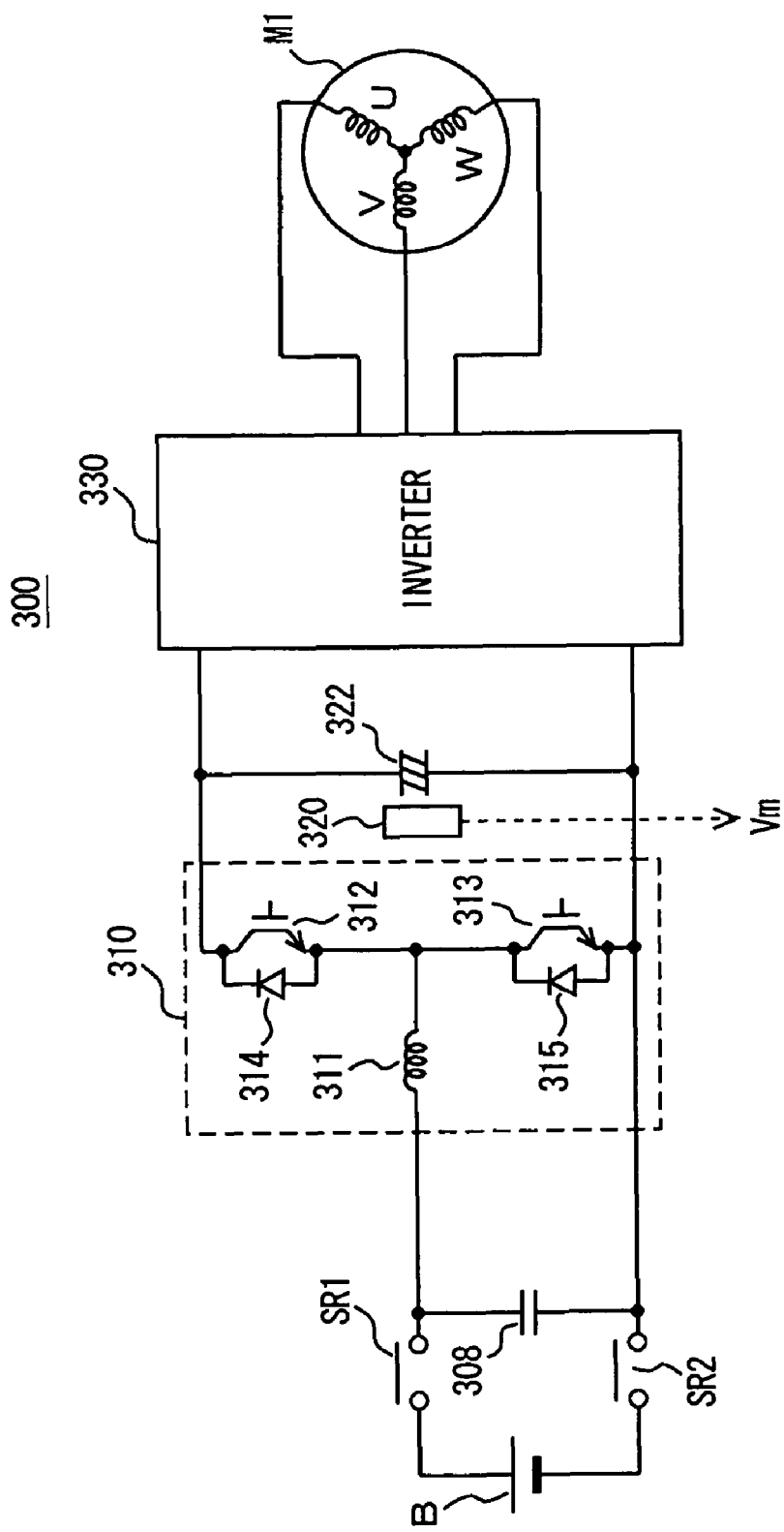
FIG. 19 is a circuit diagram and a block diagram of a conventional motor driving apparatus.
Figure 20:
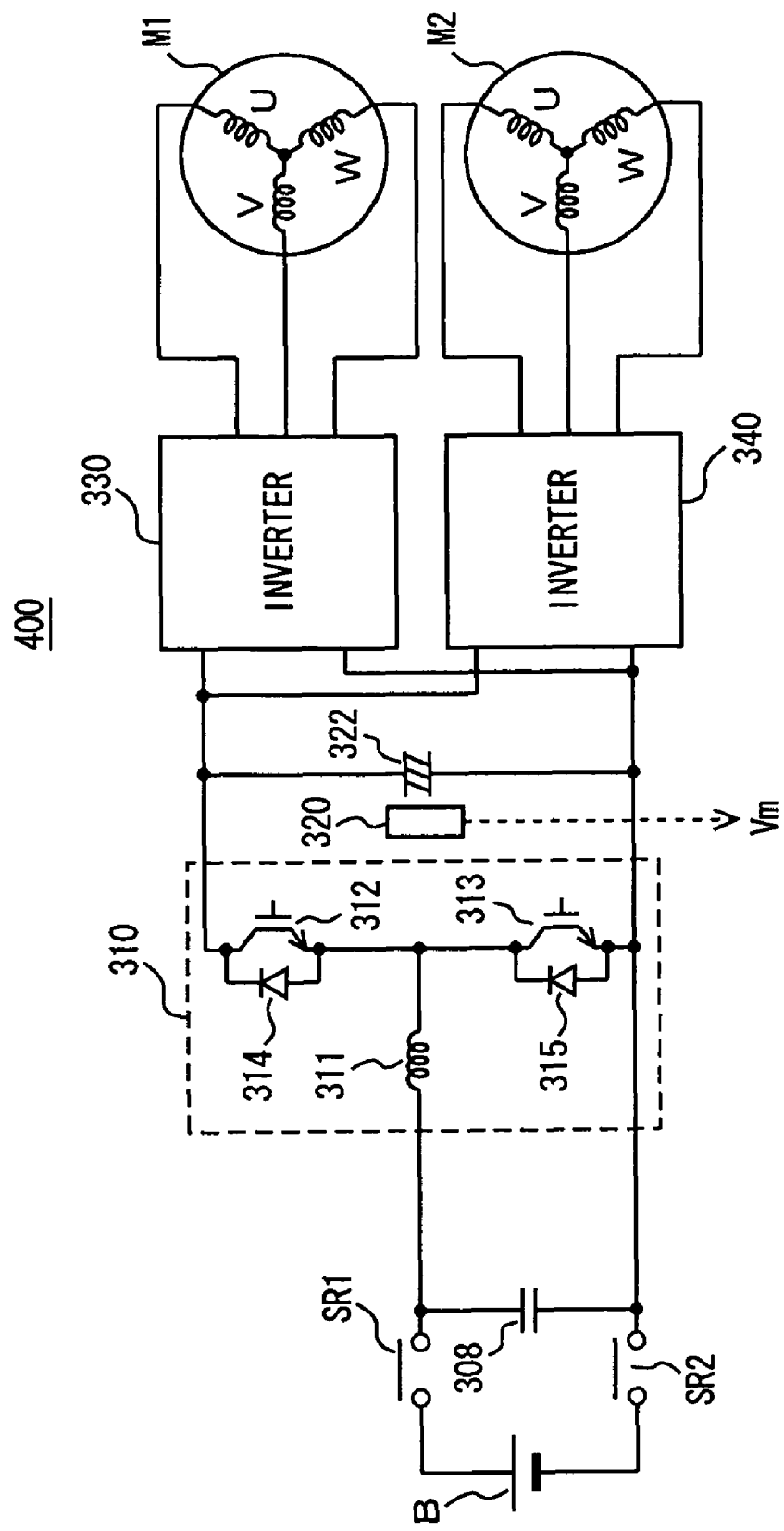
FIG. 20 is another circuit diagram and block diagram of the conventional motor driving apparatus.
Figure 21A:
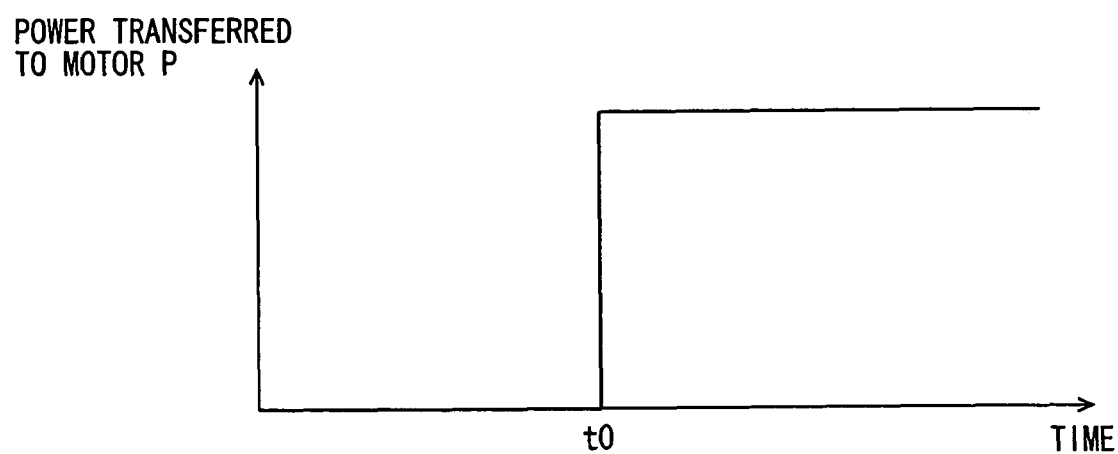
FIGS. 21A and 21B show the state of voltage when a consumed power in an electric load abruptly changes.
Figure 21B:
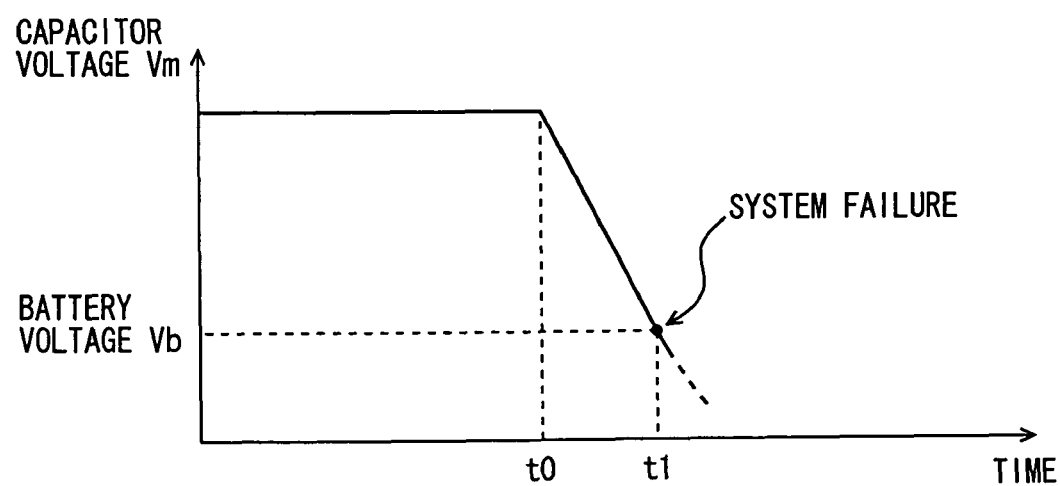

Referring to FIG. 18, in an electric load apparatus 100D according to the fifth embodiment, control apparatus 30B of electric load apparatus 100B is replaced by a control apparatus 30D. The rest of the configuration is identical to that of electric load apparatus 100B.

When the consumed power in AC motor M1 abruptly increases and increase amount Psm of the consumed power in AC motor M1 exceeds allowable power W0, control apparatus 30D controls increase amount Psm of the consumed power to be set in a range in which the driving operation of electric load apparatus 100D can be maintained. Further, when the regenerative power from capacitor 13 to DC/DC converter 12 abruptly increases and increase amount ΔPb of the regenerative power exceeds response maximum value ΔPblim, control apparatus 30D controls increase amount ΔPb of the regenerative power to be set in a range in which the driving operation of electric load apparatus 100D can be maintained.

Control apparatus 30D controls increase amount Psm of the consumed power to be set in a range in which the driving operation of electric load apparatus 100D can be maintained employing any of the first to the third embodiments described above, and controls increase amount ΔPb of the regenerative power to be set in a range in which the driving operation of electric load apparatus 100D can be maintained employing the fourth embodiment.

Accordingly, control apparatus 30D has the function of one of control apparatuses 30, 30A, 30B as well as the function of control apparatus 30C.

The control of increase amount Psm of the consumed power and increase amount ΔPb of the regenerative power in control apparatus 30D is performed according to one of the flow charts of FIGS. 4, 9 and 13, and the flow chart of FIG. 17.

Accordingly, the method for controlling increase amount Psm of the consumed power and increase amount ΔPb of the regenerative power according to one of the flow charts of FIGS. 4, 9 and 13, and the flow chart of FIG. 17 constitutes the electric load controlling method according to the present invention.

Further, a computer (CPU) controls increase amount Psm of the consumed power and increase amount ΔPb of the regenerative power according to one of the flow charts of FIGS. 4, 9 and 13, and the flow chart of FIG. 17. Accordingly, ROM is the computer (CPU) readable recording medium recording a program including each step shown in one of the flow charts of FIGS. 4, 9 and 13, and in the flow chart of FIG. 17.

The rest of the feature is identical to that of the first to fourth embodiments.

According to the fifth embodiment, the electric load apparatus includes the DC/DC converter increasing the DC voltage from the DC power source to the output voltage, and the inverter driving the AC motor by the output voltage of the DC/DC converter, and the control apparatus controlling the increase amount of the consumed power or the increase amount of the regenerative power to be set in a range in which the driving operation of the electric loads can be maintained, when the consumed power in AC motor abruptly increases or when the regenerative power from the AC motor to the DC/DC converter abruptly increases. Therefore, the driving operation of the electric loads can be continued stably even when the power in the electric loads increases to the extent that may have stopped the driving operation of the electric loads.

INDUSTRIAL APPLICABILITY

The present invention is applied to an electric load apparatus controlling the change amount of power for maintaining the driving operation of the electric load stably, when the power in the electric load abruptly changes.

The invention claimed is:

1. An electric load apparatus, comprising:
   a voltage converter performing voltage conversion between a first DC voltage being output from a DC power source and a second DC voltage having a different voltage level from a voltage level of said first DC voltage;

an electric load being driven based on said second DC voltage output from said voltage converter; and a control circuit controlling a change amount of power in said electric load to be set in a range in which a voltage converting operation of said voltage converter can be maintained when said change amount of the power exceeds a limit value, wherein said limit value is a value set based on said change amount of the power in said electric load, and said change amount does not cause said second DC voltage to be lower than said first DC voltage.

2. The electric load apparatus according to claim 1, wherein the power in said electric load is consumed power in said electric load, and said control circuit controls an increase amount of said consumed power to be at most as large as an allowable power that can be supplied to said electric load, when said increase amount of the consumed power exceeds said allowable power.

3. The electric load apparatus according to claim 2, wherein said control circuit limits said consumed power.

4. The electric load apparatus according to claim 1, wherein the power in said electric load includes generated electricity power in said electric load, said control circuit decreases a voltage instruction value of said second DC voltage to control said voltage converter when an increase amount of the generated electricity power supplied from said electric load to said voltage converter exceeds a maximum value of response of said voltage converter.

5. The electric load apparatus according to claim 4, wherein said voltage converter includes first and second switching elements for an upper arm and a lower arm, and first and second flywheel diodes respectively connected to said first and second switching elements.

6. The electric load apparatus according to claim 2, wherein said control circuit increases said allowable power to control said consumed power to be at most as large as said allowable power.

7. The electric load apparatus according to claim 6, wherein said control circuit increases a voltage instruction value of said second DC voltage to control said voltage converter.

8. The electric load apparatus according to claim 7, wherein said voltage converter includes first and second switching elements for an upper arm and a lower arm, and first and second flywheel diodes respectively connected to said first and second switching elements.

9. The electric load apparatus according to claim 2, wherein said electric load includes a motor producing torque for driving a driving wheel of a vehicle, and an inverter converting said second DC voltage to AC voltage to drive said motor in accordance with control from said control circuit.

10. The electric load apparatus according to claim 2, further comprising a capacitor element arranged between said voltage converter and said electric load and storing DC power; wherein said electric load includes a first motor producing torque for driving a driving wheel of a vehicle, a first inverter converting said second DC voltage supplied from said capacitor element to AC voltage to drive said first motor in accordance with control from said control circuit, a second motor generating electricity by power from an engine of said vehicle, and a second inverter connected in parallel with said first inverter, converting AC power generated by said second motor to DC power and supplying said DC power to said capacitor element in accordance with control from said control circuit.

11. The electric load apparatus according to claim 2, further comprising a generator connected in parallel with said electric load, wherein said control circuit controls said generator such that the generated electricity increases.

12. The electric load apparatus according to claim 11, wherein said voltage converter includes first and second switching elements for an upper arm and a lower arm, and first and second flywheel diodes respectively connected to said first and second switching elements.

13. The electric load apparatus according to claim 12, wherein said electric load includes a motor producing torque for driving a driving wheel of a vehicle, and an inverter converting said second DC voltage to AC voltage to drive said motor in accordance with control from said control circuit, wherein said generator generates electricity by power from an engine of said vehicle.

14. The electric load apparatus according to claim 1, wherein the power in said electric load is generated electricity power in said electric load, and said control circuit controls an increase amount of the generated electricity power to be supplied from said electric load to said voltage converter to be at most as large as a response maximum value of said voltage converter, when said increase amount of the generated electricity power exceeds said response maximum value.

15. The electric load apparatus according to claim 14, wherein said control circuit controls said voltage converter such that the voltage level of said second DC voltage decreases.

16. The electric load apparatus according to claim 15, wherein said voltage converter includes first and second switching elements for an upper arm and a lower arm, and said control circuit increases a time in which said first switching element is turned on to drive said voltage converter.

17. The electric load apparatus according to claim 14, wherein said electric load includes a motor producing torque for driving a driving wheel of a vehicle, and an inverter converting said second DC voltage to AC voltage to drive said motor in accordance with control from said control circuit.

18. The electric load apparatus according to claim 14, further comprising a capacitor element arranged between said voltage converter and said electric load and storing DC power, wherein
said electric load includes:
a first motor producing torque for driving a driving wheel of a vehicle;
a first inverter converting said second DC voltage supplied from said capacitor element to AC voltage to drive said first motor in accordance with control from said control circuit;
a second motor generating electricity by power from an engine of said vehicle; and
a second inverter connected in parallel with said first inverter, converting AC power generated by said second motor to DC power and supplying said DC power to said capacitor element in accordance with control from said control circuit.

19. The electric load apparatus according to claim 1, wherein
the power in said electric load is one of consumed power and generated electricity power in said electric load, and
said control circuit controls
an increase amount of said consumed power to be at most as large as an allowable power that can be supplied to said electric load, when said increase amount of the consumed power exceeds said allowable power, and
an increase amount of said generated electricity power supplied from said electric load to said voltage converter to be at most as large as a response maximum value of said voltage converter, when said increase amount of the generated electricity power exceeds said response maximum value.

20. An electric load apparatus controlling method, said electric apparatus includes a voltage converter performing voltage conversion between a first DC voltage being output from a DC power source and a second DC voltage having a different voltage level from a voltage level of said first DC voltage and an electric load being driven based on said second DC voltage output from said voltage converter, said method comprising:
a first step of detecting a change amount of power in said electric load;
a second step of determining whether said detected change amount of power exceeds a limit value; and
a third step of controlling said change amount of power in said electric load to be set in a range in which a voltage converting operation of said voltage converter can be maintained, when said change amount of power exceeds said limit value, wherein
said limit value is a value set based on said change amount of the power in said electric load, and said change amount does not cause said second DC voltage to be lower than the said first DC voltage.

21. The electric load apparatus controlling method according to claim 20, wherein
said first step detects an increase amount of a consumed power in said electric load,
said second step determines whether said increase amount of the consumed power exceeds an allowable power that can be supplied to said electric load, and
said third step controls said change amount of the consumed power to be at most as large as said allowable power, when said increase amount of the consumed power exceeds said allowable power.

22. The electric load apparatus controlling method according to claim 21, wherein
said third step limits said consumed power.

23. The electric load apparatus controlling method according to claim 21, wherein
said third step controls said voltage converter converting said first DC voltage being output from DC power source to said second DC voltage such that a voltage level of said second DC voltage being converted from said first DC voltage increases.

24. The electric load apparatus controlling method according to claim 21, wherein
said third step controls a generator connected in parallel with said electric load such that generated electricity in said generator increases.

25. The electric load apparatus controlling method according to claim 20, wherein
said first step detects an increase amount of generated electricity power in said electric load being supplied to said voltage converter converting said second DC voltage from said electric load to said first DC voltage having a voltage level different from a voltage level of said second DC voltage,
said second step determines whether said detected increase amount of the generated electricity power exceeds a response maximum value of said voltage converter, and
said third step controls said voltage converter such that said increase amount of the generated electricity power becomes at most as large as said response maximum value of said voltage converter, when said increase amount of the generated electricity power exceeds said response maximum value.

26. The electric load apparatus controlling method according to claim 25, wherein
said third step controls said voltage converter such that the voltage level of said second DC voltage decreases.

27. The electric load apparatus controlling method according to claim 20, wherein
said first step includes
a first sub-step of detecting an increase amount of a consumed power in said electric load, and
a second sub-step of detecting an increase amount of a generated electricity power in said electric load being supplied to said voltage converter converting said second DC voltage from said electric load to said first DC voltage having a voltage level different from a voltage level of said second DC voltage,
said second step includes
a third sub-step of determining whether said increase amount of the consumed power exceeds an allowable power that can be supplied to said electric load, and
a fourth sub-step of determining whether said detected increase amount of the generated electricity power exceeds a response maximum value of said voltage converter,
said third step includes
a fifth sub-step of controlling said change amount of said consumed power to be at most as large as said allowable power, when said increase amount of the consumed power exceeds said allowable power, and
a sixth sub-step of controlling said voltage converter such that said increase amount of the generated electricity power becomes at most as large as said response maximum value of said voltage converter, when said increase amount of the generated electricity power exceeds said response maximum value.

28. A computer readable recording medium recording a program for controlling an electric load apparatus, said electric load apparatus includes a voltage converter performing voltage conversion between a first DC voltage being output from a DC power source and a second DC voltage having a different voltage level from a voltage level of said first DC voltage and an electric load being driven based on said second DC voltage output from said voltage converter, said program causing a computer to execute:

a first step of detecting a change amount of power in an electric load; and a second step of determining whether said detected change amount of power exceeds a limit value; and a third step of controlling said change amount of power to be set in a range in which a voltage converting operation of said voltage converter can be maintained, when said change amount of power exceeds said limit value, wherein said limit value is a value set based on said change amount of the power in said electric load, and said change amount does not cause said second DC voltage to be lower than said first DC voltage.

29. The computer readable recording medium recording the program for causing the computer to execute according to claim 28, wherein said first step detects an increase amount of consumed power in said electric load, said second step determines whether said increase amount of the consumed power exceeds an allowable power that can be supplied to said electric load, and said third step controls said change amount of the consumed power to be at most as large as said allowable power, when said increase amount of the consumed power exceeds said allowable power.

30. The computer readable recording medium recording the program for causing the computer to execute according to claim 29, wherein said third step limits said consumed power.

31. The computer readable recording medium recording the program for causing the computer to execute according to claim 29, wherein said third step controls said voltage converter converting said first DC voltage being output from DC power source to said second DC voltage such that a voltage level of said second DC voltage being converted from said first DC voltage increases.

32. The computer readable recording medium recording the program for causing the computer to execute according to claim 29, wherein said third step controls a generator connected in parallel with said electric load such that generated electricity in said generator increases.

33. The computer readable recording medium recording the program for causing the computer to execute according to claim 28, wherein said first step detects an increase amount of generated electricity power in said electric load being supplied to said voltage converter converting said first DC voltage from said electric load to said second DC voltage having a voltage level different from a voltage level of said first DC voltage, said second step determines whether said detected increase amount of the generated electricity power exceeds a response maximum value of said voltage converter, and said third step controls said voltage converter such that said increase amount of the generated electricity power becomes at most as large as said response maximum value of said voltage converter, when said increase amount of the generated electricity power exceeds said response maximum value.

34. The computer readable recording medium recording the program for causing the computer to execute according to claim 33, wherein said third step controls said voltage converter such that the voltage level of said first DC voltage decreases.

35. The computer readable recording medium recording the program for causing the computer to execute according to claim 28, wherein said first step includes a first sub-step of detecting an increase amount of a consumed power in said electric load, and a second sub-step of detecting an increase amount of a generated electricity power in said electric load being supplied to said voltage converter converting said second DC voltage from said electric load to said first DC voltage having a voltage level different from a voltage level of said second DC voltage, said second step includes a third sub-step of determining whether said increase amount of the consumed power exceeds an allowable power that can be supplied to said electric load, and a fourth sub-step of determining whether said detected increase amount of the generated electricity power exceeds a response maximum value of said voltage converter, said third step includes a fifth sub-step of controlling said change amount of the consumed power to be at most as large as said allowable power, when said increase amount of the consumed power exceeds said allowable power, and a sixth sub-step of controlling said voltage converter such that said increase amount of the generated electricity power becomes at most as large as said response maximum value of said voltage converter, when said increase amount of the generated electricity power exceeds said response maximum value.

* * * * *